United States Patent
Bragin et al.

(10) Patent No.: US 6,721,345 B2
(45) Date of Patent: Apr. 13, 2004

(54) ELECTROSTATIC PRECIPITATOR CORONA DISCHARGE IGNITION VOLTAGE PROBE FOR GAS STATUS DETECTION AND CONTROL SYSTEM FOR GAS DISCHARGE LASERS

(75) Inventors: Igor Bragin, Göttingen (DE); Juergen Kleinschmidt, Weissenfels (DE); Gerhard Ahlborn, Harste (DE)

(73) Assignee: Lambda Physik AG, Goettingen (DE)

( * ) Notice: Subject to any disclaimer, the term of this patent is extended or adjusted under 35 U.S.C. 154(b) by 291 days.

(21) Appl. No.: 09/905,640

(22) Filed: Jul. 12, 2001

(65) Prior Publication Data

US 2002/0021731 A1 Feb. 21, 2002

Related U.S. Application Data

(60) Provisional application No. 60/286,762, filed on Apr. 25, 2001, and provisional application No. 60/218,440, filed on Jul. 14, 2000.

(51) Int. Cl.$^7$ .................................................. H01S 3/22
(52) U.S. Cl. ......................................... 372/58; 372/57
(58) Field of Search ............................ 372/57, 58, 59

(56) References Cited

U.S. PATENT DOCUMENTS

| | | |
|---|---|---|
| 3,899,750 A | 8/1975 | Hochuli .................. 331/94.5 G |
| 4,381,564 A | 4/1983 | Newman ..................... 372/87 |
| 4,393,505 A | 7/1983 | Fahlen ........................ 372/57 |

(List continued on next page.)

FOREIGN PATENT DOCUMENTS

| | | | |
|---|---|---|---|
| DE | 32 12 928 A | 10/1983 | ............. H01S/3/02 |
| DE | 42 22 418 A1 | 1/1994 | ........... G01N/27/92 |
| DE | 196 18 119 A1 | 11/1996 | ............. H01S/3/134 |
| DE | 297 13 755 U1 | 8/1997 | ............. H01S/3/03 |
| DE | 298 22 090 U1 | 3/1999 | ............. H01S/3/08 |
| JP | 09064436 A * | 3/1997 | ............. H01S/3/03 |
| JP | 1 034 1050 | 12/1998 | ........... H01S/3/036 |
| JP | 2002118309 A * | 4/2002 | ........... H01S/3/036 |

OTHER PUBLICATIONS

V. F. Weisskopf, et al., "Berechnung der natülichen Linienbreite auf Grund der Diraschen Lichttheorie," *Zeitschrift für Physik*, 1930, pp. 54–73.

J.H. Eberly, "Superradiance Revisited," *American Journal of Physics*, vol. 40/10, Oct. 1972, pp. 1374–1383.

R.S. Taylor, Preionization and Discharge Stability Study of Long Optical Pulse Duration UV–Preionized XeCl Lasers,: *Applied Physics B*, vol. B41, No. 1, Sep. 1986, pp. 1–24.

G.M. Jurisch, et al., "Gas Contaminant Effects in Discharge–Excited KrF Lasers," *Applied Optics*, vol. 31, No. 12, Apr. 20, 1992, pp. 1975–1981.

Press Release: Lambda Physik Highlights, Apr. 1993.

R. Paetzel, et al., KrF Excimer Laser with Repetition Rates on 1 KHz for DUV Lithography,: *SPIE*, vol. 2440, Feb. 22–24, 1995, pp. 101–105.

R.S. Taylor, et al., "Transmission Properties of Spark Preionization Radiation in Rare–Gas Halide Laser Gas Mixes," *IEEE Journal of Quantum Electronics*, vol. 31, No. 12, Dec. 1995, pp. 2195–2207.

D. Basting, et al., Laserrohr fur halogenhaltige Gasentladungslaser G 295 20 280.1, Jan. 25, 1995/Apr. 18, 1996.

*Primary Examiner*—Leon Scott, Jr.
(74) *Attorney, Agent, or Firm*—Stallman & Pollock LLP

(57) ABSTRACT

An excimer or molecular fluorine laser system is provided which emits a laser beam during operation and has a gas mixture with a gas composition initially provided within a discharge chamber. The laser system includes a discharge chamber containing a laser gas mixture at least including a halogen-containing species and a buffer gas, multiple electrodes within the discharge chamber and connected to a discharge circuit for energizing the gas mixture, a resonator for generating a laser beam, an electrostatic precipitator for having a voltage applied thereto and for receiving and precipitating contaminant particulates from a flow of the gas mixture, and a processor for monitoring the corona discharge ignition voltage of the electrostatic precipitator and for determining a status of said gas mixture based on the monitored voltage.

8 Claims, 8 Drawing Sheets

U.S. PATENT DOCUMENTS

| | | | |
|---|---|---|---|
| 4,399,540 A | | 8/1983 | Bucher .................. 372/20 |
| 4,429,392 A | | 1/1984 | Yoshida et al. ............... 372/9 |
| 4,534,034 A | * | 8/1985 | Hohla et al. ................ 372/59 |
| 4,574,418 A | * | 3/1986 | Yamaguchi ................ 15/268 |
| 4,591,761 A | | 5/1986 | Gregorich et al. .......... 315/170 |
| 4,611,270 A | | 9/1986 | Klauminzer et al. ....... 364/183 |
| 4,616,908 A | | 10/1986 | King .......................... 350/576 |
| 4,691,322 A | | 9/1987 | Nozue et al. ................ 372/82 |
| 4,716,569 A | | 12/1987 | Bees ........................... 372/38 |
| 4,740,982 A | | 4/1988 | Hakuta et al. ............... 372/59 |
| 4,763,336 A | | 8/1988 | Stephens ..................... 372/81 |
| 4,829,536 A | | 5/1989 | Kajiyama et al. ............. 372/57 |
| 4,856,018 A | | 8/1989 | Nozue et al. ................ 372/98 |
| 4,860,300 A | | 8/1989 | Baumler et al. ............. 372/57 |
| 4,890,040 A | | 12/1989 | Gundersen ................. 315/155 |
| 4,905,243 A | | 2/1990 | Lokai et al. .................. 372/32 |
| 4,926,428 A | | 5/1990 | Kajiyama et al. ............. 372/20 |
| 4,975,919 A | | 12/1990 | Amada et al. ................ 372/33 |
| 4,977,573 A | | 12/1990 | Bittenson et al. ............ 372/81 |
| 5,001,721 A | | 3/1991 | Ludewig et al. .............. 372/59 |
| 5,018,161 A | | 5/1991 | Akins et al. .................. 372/57 |
| 5,018,162 A | | 5/1991 | Akins et al. .................. 372/57 |
| 5,025,445 A | | 6/1991 | Anderson et al. ............ 372/20 |
| 5,027,366 A | | 6/1991 | Akins et al. .................. 372/57 |
| 5,029,177 A | | 7/1991 | Akins et al. .................. 372/57 |
| 5,090,020 A | | 2/1992 | Bedwell ...................... 372/59 |
| 5,095,492 A | | 3/1992 | Sandstrom ................. 372/102 |
| 5,097,291 A | | 3/1992 | Suzuki ......................... 355/69 |
| 5,099,491 A | | 3/1992 | Chaffee ....................... 372/59 |
| 5,111,473 A | | 5/1992 | Rebhan et al. ............... 372/59 |
| 5,136,605 A | | 8/1992 | Basting et al. ............... 372/59 |
| 5,142,543 A | | 8/1992 | Wakabayashi et al. ....... 372/32 |
| 5,149,659 A | | 9/1992 | Hakuta et al. ............... 436/55 |
| 5,150,370 A | | 9/1992 | Furuya et al. .............. 372/106 |
| 5,198,773 A | | 3/1993 | Latta .......................... 324/464 |
| 5,221,823 A | | 6/1993 | Usui ......................... 219/121.78 |
| 5,226,050 A | | 7/1993 | Burghardt .................... 372/20 |
| 5,260,961 A | | 11/1993 | Zhou et al. ................... 372/57 |
| 5,319,663 A | * | 6/1994 | Reid et al. .................... 372/59 |
| 5,337,330 A | | 8/1994 | Larson ........................ 372/86 |
| 5,377,215 A | | 12/1994 | Das et al. .................... 372/57 |
| 5,396,514 A | * | 3/1995 | Voss ............................ 372/57 |
| 5,404,366 A | | 4/1995 | Wakabayashi et al. ....... 372/29 |
| 5,430,752 A | | 7/1995 | Basting et al. ............... 372/59 |
| 5,440,578 A | | 8/1995 | Sandstrom ................... 372/59 |
| 5,450,207 A | | 9/1995 | Fomenkov .................. 356/416 |
| 5,450,436 A | | 9/1995 | Mizoguchi et al. ........... 372/59 |
| 5,535,233 A | | 7/1996 | Mizoguchi et al. ........... 372/87 |
| 5,557,629 A | | 9/1996 | Mizoguchi et al. ........... 372/87 |
| 5,559,584 A | | 9/1996 | Miyaji et al. ................. 355/73 |
| 5,559,816 A | | 9/1996 | Basting et al. ............... 372/27 |
| 5,586,134 A | | 12/1996 | Das et al. .................... 372/38 |
| 5,596,596 A | | 1/1997 | Wakabayashi et al. ...... 372/102 |
| 5,642,374 A | | 6/1997 | Wakabayashi et al. ....... 372/57 |
| 5,646,954 A | | 7/1997 | Das et al. .................... 372/55 |
| 5,659,419 A | | 8/1997 | Lokai et al. ................. 359/330 |
| 5,663,973 A | | 9/1997 | Stamm et al. ................ 372/20 |
| 5,684,822 A | | 11/1997 | Partlo .......................... 372/95 |
| 5,729,562 A | | 3/1998 | Birx et al. .................... 372/38 |
| 5,729,564 A | * | 3/1998 | Cullumber ................... 372/58 |
| 5,729,565 A | | 3/1998 | Meller et al. ................. 372/87 |
| 5,748,346 A | | 5/1998 | David et al. ................. 359/15 |
| 5,754,579 A | | 5/1998 | Mizoguchi et al. ........... 372/58 |
| 5,761,236 A | | 6/1998 | Kleinschmidt et al. ..... 372/100 |
| 5,802,094 A | | 9/1998 | Wakabayashi et al. ....... 372/57 |
| 5,811,753 A | | 9/1998 | Weick et al. ........... 219/121.78 |
| 5,818,865 A | | 10/1998 | Watson et al. ............... 372/86 |
| 5,835,520 A | | 11/1998 | Das et al. .................... 372/57 |
| 5,852,627 A | | 12/1998 | Ershov ....................... 372/108 |
| 5,856,991 A | | 1/1999 | Ershov ........................ 372/57 |
| 5,887,014 A | | 3/1999 | Das ............................. 372/59 |
| 5,898,725 A | | 4/1999 | Fomenkov et al. ......... 372/102 |
| 5,901,163 A | | 5/1999 | Ershov ........................ 372/20 |
| 5,914,974 A | | 6/1999 | Partlo et al. ................. 372/38 |
| 5,917,849 A | | 6/1999 | Ershov ....................... 372/102 |
| 5,923,693 A | | 7/1999 | Ohmi et al. .................. 372/57 |
| 5,936,988 A | | 8/1999 | Partlo et al. ................. 372/38 |
| 5,940,421 A | | 8/1999 | Partlo et al. ................. 372/38 |
| 5,946,337 A | | 8/1999 | Govorkov et al. ............ 372/92 |
| 5,949,806 A | | 9/1999 | Ness et al. ................... 372/38 |
| 5,970,082 A | | 10/1999 | Ershov ....................... 372/102 |
| 5,978,391 A | | 11/1999 | Das et al. .................... 372/20 |
| 5,978,394 A | | 11/1999 | Newman et al. ............. 372/58 |
| 5,978,406 A | | 11/1999 | Rokni et al. ................. 372/58 |
| 5,978,409 A | | 11/1999 | Das et al. ................... 372/100 |
| 5,982,795 A | | 11/1999 | Rothweil et al. ............. 372/38 |
| 5,982,800 A | | 11/1999 | Ishihara et al. ............... 372/57 |
| 5,991,324 A | | 11/1999 | Knowles et al. .............. 352/57 |
| 5,999,318 A | | 12/1999 | Morton et al. .............. 359/572 |
| 6,005,879 A | | 12/1999 | Sandstrom et al. ........... 372/25 |
| 6,005,880 A | | 12/1999 | Basting et al. ............... 372/38 |
| 6,014,206 A | | 1/2000 | Basting et al. .............. 356/138 |
| 6,014,398 A | | 1/2000 | Hofmann et al. ............. 372/60 |
| 6,020,723 A | | 2/2000 | Desor et al. ................. 320/166 |
| 6,028,872 A | | 2/2000 | Partlo et al. ................. 372/38 |
| 6,028,880 A | | 2/2000 | Carlesi et al. ................ 372/58 |
| 6,061,382 A | | 5/2000 | Govorkov et al. .......... 372/101 |
| 6,081,542 A | | 6/2000 | Scaggs ........................ 372/70 |
| 6,151,346 A | | 11/2000 | Partlo et al. ................. 372/38 |
| 6,154,470 A | | 11/2000 | Basting et al. ............... 372/19 |
| 6,157,662 A | | 12/2000 | Scaggs et al. ................ 372/60 |
| 6,160,831 A | | 12/2000 | Kleinschmidt et al. ....... 372/57 |
| 6,160,832 A | | 12/2000 | Kleinschmidt et al. ....... 372/57 |
| 6,188,226 B1 | * | 2/2001 | Ochiai ........................ 324/458 |
| 6,198,761 B1 | | 3/2001 | von Bergmann et al. ..... 372/86 |
| 6,212,214 B1 | | 4/2001 | Vogler et al. ................. 372/59 |
| 6,219,368 B1 | | 4/2001 | Govorkov ..................... 372/59 |
| 6,226,307 B1 | | 5/2001 | Desor et al. .................. 372/37 |
| 6,243,405 B1 | | 6/2001 | Borneis et al. ............... 372/57 |
| 6,243,406 B1 | | 6/2001 | Heist et al. ................... 372/59 |
| 6,373,523 B1 | * | 4/2002 | Jang ........................... 348/273 |
| 2002/0021731 A1 | * | 2/2002 | Bragin et al. ................. 372/57 |

* cited by examiner

OUTPUT ENERGY IS DEPENDENT ON
FLUORINE PARTIAL PRESSURE (QUALITATIVELY)
OF A KrF-EXCIMER LASER

GRAPH E, LASER OUTPUT ENERGY
VERSUS VOLTAGE OF THE DRIVING CIRCUIT

DROP OF THE GRAPHS E DURING AGING
OF THE GAS MIXTURE E.G. $F_2$

DECREASE OF THE SLOPE OF THE $E(\mu)$
CURVE BY DEPLETION OF THE $F_2$ PORTION
WITHIN THE DISCHARGE CHAMBER

US 6,721,345 B2

ELECTROSTATIC PRECIPITATOR CORONA DISCHARGE IGNITION VOLTAGE PROBE FOR GAS STATUS DETECTION AND CONTROL SYSTEM FOR GAS DISCHARGE LASERS

PRIORITY

This application claims the benefit of priority to U.S. provisional patent application Nos. 60/218,440, filed Jul. 14, 2000, and 60/286,762, filed Apr. 25, 2001.

BACKGROUND OF THE INVENTION

1. Field of the Invention

The present invention relates to methods and apparatus for stabilizing output beam parameters of a gas discharge laser. More particularly, the present invention relates to a gas discharge laser system which includes components for monitoring a corona discharge ignition voltage at an electrostatic dust precipitator, to provide gas mixture status information, which is preferably for guiding gas control actions for maintaining an optimal gas mixture composition over long periods.

2. Description of the Related Art

Pulsed gas discharge lasers such as excimer and molecular flourine lasers, emitting in the deep ultraviolet (DUV) or vacuum ultraviolet (VUV) have become very important for industrial applications such as photolithography. Such lasers generally include a discharge chamber containing two or more gases such as a halogen-containing species and one or two rare gases. KrF (248 nm), ArF (193 nm), XeF (350 nm), KrCl (222 nm), XeCl (308 nm), and $F_2$ (157 nm) lasers are examples.

Efficiencies of excitation of the gas mixtures and various parameters of output beams of these lasers vary sensitively with the compositions of their gas mixtures. An illustrative gas mixture composition for a KrF laser may have gas mixture component ratios around $\sim 0.1\%$ $F_2/\sim 1.0\%$ Kr/$\sim 98.9\%$ Ne (see U.S. Pat. No. 4,393,505, which is assigned to the same assignee and is hereby incorporated by reference). For an ArF laser, an around 1.0% concentration of argon would be used instead of the around 1.0% krypton of the KrF laser. A $F_2$ laser may have a gas component ratio around $\sim 0.1\%$ $F_2/\sim 99.9\%$ He and/or Ne (see U.S. Pat. No. 6,157,662, which is assigned to the same assignee as the present application and is hereby incorporated by reference). Small amounts of a gas additive, e.g., Xe, may be added to any of these gas mixtures for improving energy stability or overshoot control, for example. (see U.S. patent application Ser. No. 09/513,025, which is assigned to the same assignee as the present application and is hereby incorporated by reference; see also R. S. Taylor and K. E. Leopold, Transmission Properties of Spark Preionization Radiation in Rare-Gas Halide Laser Gas Mixes, IEEE Journal of Quantum Electronics, pp. 2195–2207, vol. 31, no. 12 (December 1995)). Any deviation from the optimum gas compositions of these lasers typically results in instabilities or reductions from optimal of one or more output beam parameters such as beam energy, energy stability, temporal pulse width, temporal coherence, spatial coherence, discharge width, bandwidth, and long and short axial beam profiles and divergences.

Especially important in this regard is the concentration (or partial pressure) of the halogen-containing species, e.g., $F_2$ or HCL, in the gas mixture. FIG. 1 shows laser output efficiency versus fluorine concentration for a KrF-excimer laser, illustrating a decreasing output efficiency away from a central maximum. FIG. 2 shows the dependence of output energy on driving voltage (i.e., applied by the discharge circuit to the gas mixture at electrodes within a discharge chamber of the laser). FIG. 3A illustrates effects of gas mixture aging on laser output energy. FIG. 3B further illustrates how the slope of the curve for energy output vs. driving voltage also decreases with aging of the gas mixture.

For industrial applications, it is recognized in the present invention that it would be advantageous to have an excimer or molecular fluorine laser capable of operating continuously for long periods of time, i.e., having minimal downtime. It is desired to have an excimer or molecular fluorine laser capable of running non-stop year round, or at least having a minimal number and duration of down time periods for scheduled maintenance, while maintaining constant output beam parameters. For example, uptimes of greater than 95% or even 98% wold be advantageous and may be achieved if precise control and stabilization of output beam parameters, including precise control of the composition of the gas mixture were provided with these laser systems.

Unfortunately, gas contamination occurs during operation of excimer and molecular fluorine lasers due to the aggressive nature of the fluorine or chlorine-containing species in the gas mixture. The halogen gas is highly reactive and its concentration in the gas mixture decreases as it reacts, leaving traces of contaminants. The halogen gas reacts with materials of the discharge chamber or tube as well as impurities in the chamber. Moreover, the reactions take place and the gas mixture degrades whether the laser is operating (discharging) or not. The passive gas lifetime is about one week for a typical KrF-laser.

During operation of a KrF-excimer laser, such contaminants as HF, $CF_4$, $COF_2$, $SiF_4$ have been observed to increase in concentration rapidly (see G. M. Jurisch et al., Gas Contaminant Effects in Discharge-Excited KrF Lasers, Applied Optics, Vol. 31, No. 12, pp. 1975–1981 (Apr. 20, 1992)). For a static KrF laser gas mixture, i.e., with no discharge running, increases in the concentrations of HF, $O_2$, $CO_2$ and $SiF_4$ have been observed (see Jurisch et al., above).

One way to reduce the rate of this gas degradation is by reducing or eliminating contamination sources within the laser discharge chamber. With this in mind, an all metal, ceramic laser tube has been disclosed (see D. Basting et al., Laserrohr für halogenhaltige Gasentladungslaser" G 295 20 280.1, Jan. 25, 1995/Apr. 18, 1996 (disclosing the Lambda Physik Novatube, and hereby incorporated by reference into the present application)). Gas purification systems, such as cryogenic gas filters (see U.S. Pat. Nos. 4,534,034, 5,136,605, 5,430,752, 5,111,473 and 5,001,721, which are hereby incorporated by reference) or electrostatic particle filters (see U.S. Pat. Nos. 4,534,034 and 5,586,134, which are hereby incorporated by reference) may also be used to extend excimer and molecular fluorine laser gas lifetimes to, e.g., 100 million shots before a new fill of the gas mixture into the laser tube may become advisable.

It is not easy to directly measure the halogen concentration within the laser tube for making rapid online adjustments (for example, see U.S. Pat. No. 5,149,659, disclosing monitoring chemical reactions in the gas mixture, which is hereby incorporated by reference). A more preferable approach may be to indirectly monitor the halogen concentration by monitoring a parameter that varies with a know relationship to the halogen concentration. In such a method, precise values of the parameter would be directly measured, and the $F_2$ concentration would be calculated from those values or pulled from tables stored in a memory accessible by a control processor of the laser system. In this way, the $F_2$ concentration may be indirectly monitored (see U.S. patent application Ser. No. 09/734,459, which is assigned to the same assignee as the present application and is hereby incorporated by reference, disclosing indirect monitoring of the composition of the gas mixture by monitoring laser input and/or output beam parameters).

Some methods have been disclosed for such indirect monitoring of halogen depletion in a narrow band excimer laser by monitoring beam profile (see U.S. Pat. No. 5,642,374, hereby incorporated by reference) and spectral (band) width (see U.S. Pat. No. 5,450,436, hereby incorporated by reference). However, beam profile and spectral width are each influenced by various other operational conditions such as repetition rate, tuning accuracy, thermal conditions and aging of the laser tube. Thus, the same spectral width can be generated by different gas compositions depending on these other operating conditions.

Another way of stabilizing, during operation, a gas mixture with a gas composition initially provided within a discharge chamber of an excimer or molecular fluorine gas discharge laser is described in U.S. Pat. No. 6,243,405, which is assigned to the same assignee as the present application and is hereby incorporated by reference. The method disclosed in the '818 application includes monitoring a temporal pulse shape of the laser beam and adjusting and/or determining the status of the gas mixture based on the monitored temporal pulse shape. The monitored temporal pulse shape is preferably compared with a reference temporal pulse shape. A difference or deviation between a measured temporal pulse shape and a reference temporal pulse shape is determined. The amounts of and intervals between gas replenishment actions are determined based on the pulse shape deviation. The energy of the beam is preferably also monitored and the driving voltage and gas actions are adjusted to stabilize the energy, energy stability and/or energy dose.

Another advantageous technique has been disclosed including monitoring amplified spontaneous emission (ASE), and is described in U.S. Pat. No. 6,243,406, which is assigned to the same assignee as the present application and is hereby incorporated by reference. The ASE is demonstrated to be very sensitive to changes in fluorine concentration, and thus the fluorine concentration may be monitored indirectly by monitoring the ASE, notwithstanding whether other parameters are changing and effecting each other as the fluorine concentration in the gas mixture changes.

Another way to measure the gas status is to use a mass spectrometer (see U.S. Pat. No. 5,090,020 and hereby incorporated by reference). However, this device is costly to incorporate into an excimer laser system. The gas status may also be monitored by U-I characteristics of a corona discharge (see German Patent Application DE 42 22 418 A1, which is hereby incorporated by reference). However, it is desired to have a method that has a higher sensitivity.

Excimer lasers have utilized gas flow loops for removing gases from the laser tube, cleaning the removed gas by passing it through an electrostatic precipitator, and putting the gas back into the laser tube by passing the clean gas near the laser windows and through a baffle structure which keeps the laser tube windows clean. Some early designs are described at U.S. Pat. Nos. 4,534,034 and 5,018,162 which are hereby incorporated by reference, as well as U.S. Pat. No. 5,729,564 which describes a later design. In addition, Lambda Physik AG of Goettingen, Germany and Fort Lauderdale, Fla. has been selling excimer lasers for many years having a pair of gas flow loops which draw gas from the laser tube near the respective laser tube windows, pass the gas through the precipitator to clean the gas, and re-insert the gas by flowing past the windows and through baffle boxes and into the main volume of the laser tube. These techniques lengthen the lifetime of the laser tube windows and the gas mixture. A technique is provided in the present invention for further enhancing the lifetime of the windows and/or the gas mixture.

SUMMARY OF INVENTION

In view of the above, it is an object of the invention to provide a technique for stabilizing output beam parameters affected by halogen depletion by controlling the halogen and/or rare gas concentrations in the gas mixture within the laser tube of an excimer or molecular fluorine ($F_2$) laser. The present invention provides an advantageous technique for determining the status of the gas mixture in the discharge chamber. The status information can then be used to control the halogen and/or rare gas concentrations.

It is a further object of the invention to provide a technique for monitoring gas mixture status that independently monitors when and to what extent the mixture has 'aged' (meaning changes in the concentration of one or more component gases over time). The present invention provides an advantageous technique for determining the status of the gas mixture which is not affected by resonator losses or degradation of the optics. The invention provides a signal which is independently related to the status of the gas mixture of the gas discharge laser. This sign al may also be used as an input to an algorithm, or a control circuit, to better guide performance of gas replenishment actions. The invention would be particularly useful in all gas lasers where sustained optimum performance requires compensating for the "aging" of the active medium. The invention would be especially useful in pulsed gas discharge lasers (e.g. excimer lasers, including $F_2$ lasers).

Specifically, an excimer or molecular fluorine laser system is provided which emits a laser beam during operation and has a gas mixture with a gas composition initially provided within a discharge chamber. The laser system includes a discharge chamber containing a laser gas mixture at least including a halogen-containing species and a buffer gas, multiple electrodes within the discharge chamber and connected to a discharge circuit for energizing the gas mixture, a resonator for generating a laser beam, an electrostatic precipitator for having a voltage applied thereto and for receiving and precipitating contaminant particulates from a flow of the gas mixture, and a processor for monitoring the voltage applied to the electrostatic precipitator and for determining a status of said gas mixture based on the voltage applied to the electrostatic precipitator. The determined status preferably includes a concentration of the halogen-containing species.

The laser system preferably further includes a gas control unit for replenishing the laser gas mixture in response to signals from the processor based on the status of the gas mixture determined from the voltage applied to the electrostatic precipitator. The gas replenishment preferably includes replenishing the halogen-containing species of the gas mixture.

An excimer or molecular fluorine laser system which emits a laser beam during operation and has a gas mixture with a gas composition initially provided within a discharge chamber is further provided including a discharge chamber containing a laser gas mixture at least including a halogen-containing species and a buffer gas, multiple electrodes within the discharge chamber and connected to a discharge circuit for energizing the gas mixture, a resonator for generating a laser beam, an electrode for having a voltage applied thereto and for generating a corona discharge in a gas mixture environment, a corona discharge ignition voltage probe for monitoring a corona discharge ignition voltage applied to the electrode, and a processor for receiving signals corresponding to the corona discharge ignition voltage monitored by the corona discharge ignition voltage probe and for determining a status of the gas mixture based on the corona discharge ignition voltage. The determined status preferably includes a concentration of the halogen-containing species.

The laser system preferably further includes a gas control unit for replenishing the laser gas mixture in response to signals from the processor based on the status of the gas mixture determined from the corona discharge ignition voltage. The gas replenishment preferably includes replenishing the halogen-containing species of the gas mixture.

A method of stabilizing output beam parameters of an excimer or molecular fluorine laser system which emits a laser beam during operation and has a gas mixture with a gas composition initially provided within a discharge chamber, wherein the laser system includes an electrostatic precipitator, is also provided including monitoring a voltage applied to the electrostatic precipitator and determining a status of the gas mixture based on the voltage applied to the electrostatic precipitator. The determining operation preferably includes determining a concentration of a halogen-containing species of the gas mixture.

The method preferably further includes the operation replenishing the gas mixture based on the status of the gas mixture determined from the voltage applied to the electrostatic precipitator. The replenishing operation preferably includes replenishing a halogen-containing species of the gas mixture.

A further method is provided for stabilizing output beam parameters of an excimer or molecular fluorine laser system which emits a laser beam during operation and has a gas mixture with a gas composition initially provided within a discharge chamber including the operations applying a voltage to an electrode for generating a corona discharge in a gas mixture environment, monitoring a corona discharge ignition voltage applied to the electrode, and determining a status of the gas mixture based on the corona discharge ignition voltage. The determined status preferably includes a concentration of a halogen-containing species of the gas mixture.

The method preferably further includes the operation replenishing the gas mixture based on the status of the gas mixture determined from the corona discharge ignition voltage. The replenishing operation preferably includes replenishing a halogen-containing species of the gas mixture.

BRIEF DESCRIPTION OF THE DRAWINGS

FIG. 13b shows a side view of the laser tube of FIG. 13a.

INCORPORATION BY REFERENCE

Figure 1:
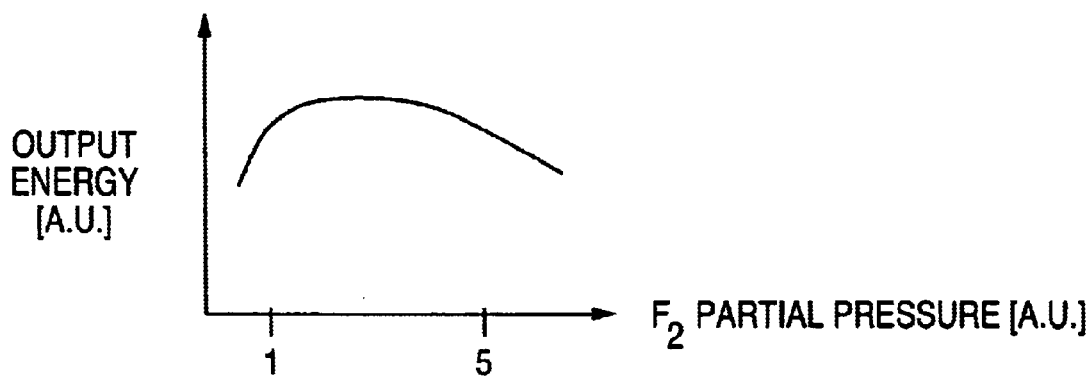
FIG. 1 is a graph depicting for a KrF-excimer laser the relationship between energy output and the partial pressure of flourine gas.

What follows is a cite list of references which are, in addition to the references cited above in the background section and below in the detailed description of the preferred embodiments, and the background and invention summary sections themselves, hereby incorporated by reference into the detailed description of the preferred embodiments below, as disclosing alternative embodiments of elements or features of the preferred embodiments not otherwise set forth in detail below. A single one or a combination of two or more of these references may be consulted to obtain a variation of the preferred embodiments described in the detailed description below. Further patent, patent application and non-patent references are cited in the written description and are also incorporated by reference into the preferred embodiment with the same effect as just described with respect to the following references:

U.S. Pat. Nos. 6,243,405, 6,212,214 and 6,243,406; and

U.S. patent application Ser. Nos. 09/447,882, 09/842,281, 09/583,037, 09/513,025, 09/865,908, 09/734,459, 09/688,561, 09/780,120 and 09/838,715, which are assigned to the same assignee as the present application.

DETAILED DESCRIPTION OF THE PREFERRED EMBODIMENTS

For discharge gas lasers, including excimer and molecular lasers, and molecular fluorine lasers, the gas mixture in the laser tube is a mixture of different gases, typically including a halogen-containing species and at least one noble gas (e.g., $F_2$, Kr and Ne, with a proportion typically of 0.1% $F_2$, 1% Kr, 98.9% Ne, for a KrF excimer laser). A desired gas lifetime would be at least one week of use or $10^9$ shots, and both static and dynamic gas life times are desired to be increased, i.e., the duration of use before the gas is replaced in a new fill procedure is desired to be increased. Without any precautions the discharge gas mixture "ages" continuously resulting in a decrease of the laser performance. In excimer and molecular fluorine lasers, mostly halogen (e.g. $F_2$ or HCl) is lost in this way. For this reason, a measuring tool and technique that indicates the discharge gas status as to when and to what extent the mixture is aged is provided herein.

An improved excimer or molecular fluorine laser system is described, wherein the gas mixture status may be precisely and periodically determined and smoothly adjusted. An effective and sensitive method and apparatus for determining a status of the gas mixture and its degree of aging or degradation is described below in accordance with a preferred embodiment. This method includes monitoring the gas mixture status without variations in laser optics (e.g. misalignment) or the driving voltage affecting the measurement.

A technique is further described for automatically compensating gas mixture degradation without disturbing laser operation conditions when the gas is replenished. An improved excimer or molecular fluorine laser system is described which is capable of running continuously while maintaining stable output beam parameters.

The status of the laser gas mixture is preferably determined by monitoring corona discharge properties of the laser gas (e.g., voltage of the corona discharge, the behavior of the Volt-Ampere characteristic of the corona discharge), preferably at the electrostatic precipitator. These corona discharge voltage parameters depend upon the status of the gas and the concentration of the halogen-containing species (e.g., molecular fluorine or hydrogen chloride).

In one embodiment, a measure of the gas mixture status is provided as an input signal to an electronic display for the system operator or as an input signal for an automatic regulation loop including a processor ensuring optimum gas conditions of the laser for a long period. A signal is transmitted according to a corona discharge voltage parameter of the gas mixture to a computer or other control unit (e.g., processor). As input to a control unit, the signal guides the gas mixture adjustment or control actions (e.g., amounts, intervals and/or kinds of gas species to be injected by the gas supply unit into the gas discharge chamber) so as to maintain a proper gas mixture and to ensure optimum laser performance over the gas life. It may be determined that no gas action will be presently performed or that gas needs to be released from the chamber. Also, the interval between the previous gas action and the next gas action may be adjusted. As input to a control unit, this signal may also direct replacement of the gas mixture at the end of the gas life.

In an additional or alternative embodiment, an elongated tube, pipe or partially tubular component is disposed in the laser tube, and preferably attached to the laser tube housing, and is disposed preferably near the blower which circulates the laser gas. The elongated tube or pipe has an elongated slit or opening along its length and preferably facing the gas flow and preferably longer than the discharge length. Laser gas goes into the elongated tube through the slit, which may be coupled with a pump or is at least at a lower pressure than the gas mixture in the laser tube. The elongated tube allows efficient removal of contaminant species prior to inserting fresh gas into the laser tube during a new fill procedure. The elongated tube may also be efficiently used to gather gases from the laser tube for passing the gases through an electrostatic precipitator loop for cleaning the gases and flowing the cleaned gases passes the laser tube windows.

The preferred embodiments provide a more independent and direct approach to assessing the laser gas mixture status by measurement of the corona gas discharge voltage of the electrostatic precipitator of a gas discharge laser. Advantages of detection of the gas status via this method is supported by experimental findings that this voltage depends upon the partial pressures of the gas components.

U.S. patent application Ser. No. 09/583,037, which is assigned to the same assignee as the present application and is hereby incorporated by reference described methods related to the measurement and use of the dc-breakdown voltage of the gas mixture in a system for controlling the gas composition of the gas mixture of a gas discharge laser system. The '037 application describes an empirical relationship between the static breakdown voltage of the laser gas mixture and its halogen content.

In advancing on the disclosure of the '037 application, according to a preferred embodiment herein, the electrodes of a electrostatic dust precipitator may be used to detect the dc-breakdown voltage for monitoring the status of the gas mixture, and particularly the concentration of the halogen-containing species therein. The ignition voltage of the corona discharge also depends upon the halogen gas concentration. Measurement of the electrical characteristics associated with the ignition of the corona discharge of the electrostatic precipitator therefore provides a value indicative of the gas status. The resulting values can be used in a processing regulation loop. In a preferred embodiment, the discharge corona ignition voltage at the electrostatic precipitator electrodes is measured directly and under conditions of constant current from the high voltage power supply to the electrostatic precipitator. The electrical characteristics may be measured by using a voltage probe to monitor the high voltage power supply circuit of the electrostatic precipitator. The design of voltage probes, for instance, is well known in the art. Oscilloscopes, voltmeters, and galvanometers may be used to monitor the driving voltages.

Figure 4:
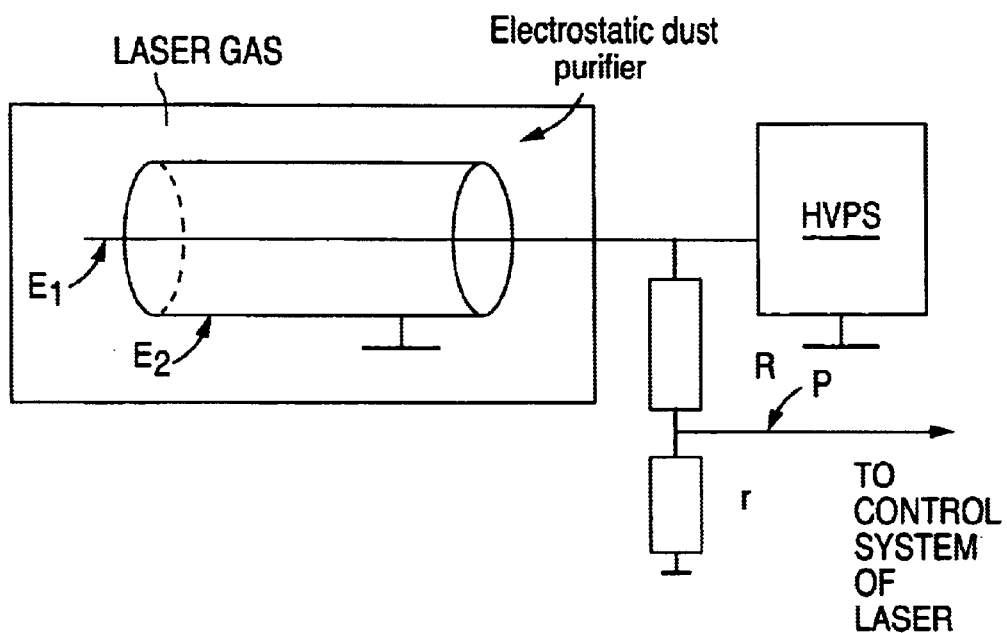
FIG. 4 is a schematic block diagram of an example of an electrostatic precipitator located within a laser gas chamber, the external high voltage power supply, and a voltage probe according to the present invention.

An apparatus according to a preferred embodiment for measuring the corona discharge ignition voltage is illustrated schematically at FIG. 4 which shows a schematic block diagram of an electrostatic precipitator with such a voltage probe P. This embodiment includes a voltage probe P connected to the high voltage power supply (HVPS) of the electrostatic precipitator. The preferred probe P is connected to the power supply through a large resistor, R, and having a small resistor, r connected between the probe P and ground. In one embodiment of the probe P, for instance, the R resistor is a 10 MΩ resistor, and the smaller resistor is a 10 KΩ resistor.

The high voltage power supply HVPS is current stabilized at a fixed level (e.g., between 1 mA to 3 mA). The voltage measured by the probe P will then vary depending on the discharge conditions of the precipitator, and particularly, depending on the composition of the gas mixture between the electrodes $E_1$ and $E_2$, as it is recognized herein that the breakdown voltage depends on the composition of the gas mixture. The gas mixture between the electrodes $E_1$ and $E_2$ of the precipitator is substantially the same as the gas mixture in the discharge tube between the main discharge electrodes of the excimer or molecular fluorine laser with which the precipitator is being used. This is because, although not shown in FIG. 4 (but see FIG. 5), the gas mixture between the electrodes $E_1$ and $E_2$ of the precipitator is drawn from the discharge tube of the laser. Therefore, by monitoring the voltage at the voltage probe P, the status of the gas mixture in the laser tube of the excimer or molecular fluorine laser is advantageously be monitored in accordance with an object of the invention.

The corona discharge ignition voltage of the electrodes $E_1$ and $E_2$ of the electrostatic precipitator is measured for detecting the gas content or composition of the laser gas mixture. This voltage is monitored by the voltage probe P as shown in FIG. 4. The voltage probe P then provides a signal according to the measured voltage to a computer control system (not shown). This signal is used by the processor to control gas actions for replenishing particularly the fluorine content of the gas mixture in the laser tube of the laser by sending signals to a gas control unit (not shown in FIG. 4, but see FIG. 6). The gas control unit advantageously provides such gas actions as micro-halogen injections ($\mu$HI) and other gas replenishment or control actions as described in more detail with reference to FIG. 6. Preferably, the gas actions are controlled in a feedback loop with the processor and gas handling unit so that the corona discharge ignition voltage measured by the voltage probe P is maintained at or near the corona discharge ignition voltage just after a new fill. This ensures that the gas mixture composition within the laser tube is maintained at substantially an optimal composition, and particularly that the fluorine concentration is substantially optimal.

Figure 5:
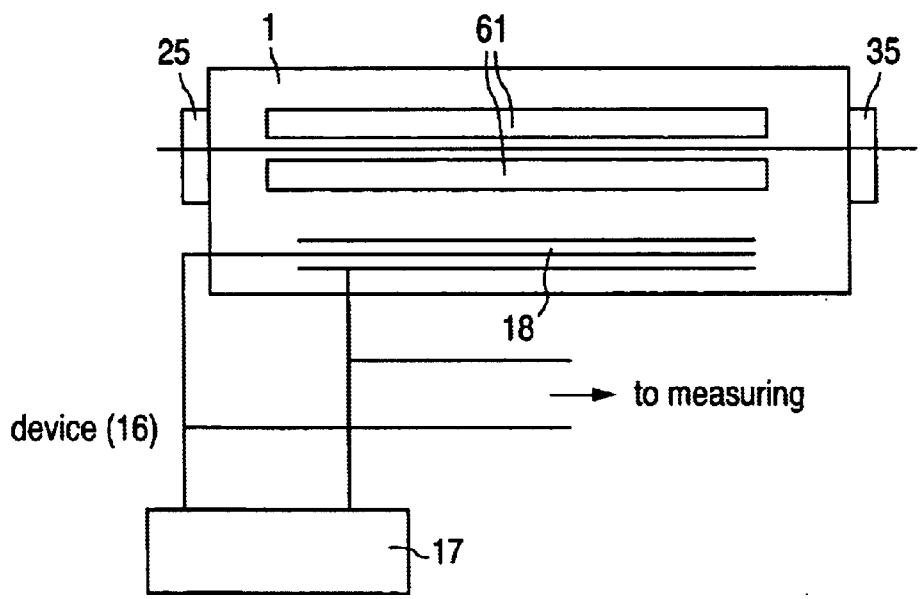
FIG. 5 is a schematic diagram of a preferred arrangement of the electrostatic precipitator and the laser chamber according to the present invention.

FIG. 5 schematically illustrates an arrangement of the electrostatic precipitator with respect to a laser tube or laser chamber 1 containing main discharge electrodes 61. These main discharge electrodes 61 are connected to a pulsed power supply circuit (not shown) for energizing the gas mixture in the laser tube 1, which is part of a laser resonator (also not shown in FIG. 5), for generating a laser beam. In this arrangement, the high voltage current stabilized power supply (17) is connected to the electrodes 18, which correspond to the electrodes $E_1$ and $E_2$ of FIG. 4 (i.e., preferably an internal wire $E_1$ and cylindrical tube $E_2$), of the electrostatic precipitator which are shown located within the discharge tube 1, although the precipitator is preferably disposed within a separate volume from the main portion of the laser tube 1. The electrostatic precipitator circuitry is connected to a measuring device (not shown). While the electrostatic precipitator electrodes (18) of FIG. 5 are configured as an internal wire electrode passing through the center of a cylindrical electrode other arrangements of suitable electrode configurations for an electrostatic precipitator may be understood by those skilled in the art.

The placement of the electrodes 18 of the electrostatic precipitator need not be within a separated volume of the laser chamber 1 itself, for example, the precipitator may be outside the laser chamber 1 and a slit or port is provided on the laser chamber 1 for drawing gas from the chamber 1 into the precipitator. The gas is flowed from the chamber 1 through the precipitator, where the gas is cleaned by removing dust particles, and then the gas is flowed back into the chamber 1 through a baffle box at the laser tube windows 25, 35. The windows (25, 35) are kept clean in this way because only this very clean gas flows past the windows 25, 35 and dust particles in the gas mixture are thereby prevented from accessing the window, i.e., depositing on the windows 25, 35 whereby a thin film could otherwise grow that would tend to absorb or otherwise DUV or VUV light and attenuate the beam. Preferably, a gas flow loop with the same or a different electrostatic precipitator is provided for each window 25, 35. The gas flow loop including the precipitator is described in more detail at U.S. Pat. No. 4,534,034 (hereby incorporated by reference), whereby an electrostatic precipitator is used to clean some portion of gas before flowing that gas to the laser tube windows 25, 35 to keep the windows 25, 35 clean. As mentioned baffle boxes are preferably included in the window structure and positioned near the windows to trap contaminants emanating from the discharge area between the main electrodes 61 of the laser to keep the contaminant particulates from accessing the windows 25, 35.

Pulsed gas discharge lasers such as excimer and molecular and molecular flourine lasers emitting in the deep ultraviolet (DUV) or vacuum ultraviolet (VUV) have become very important for industrial applications such as photolithography. Such lasers generally include a discharge chamber containing two or more gases such as a halogen and one or two rare gases. KrF (248 nm), ArF (193 nm), XeF (350 nm), KrCl (222 nm), XeCl (308 nm), and $F_2$ (157 nm) lasers are examples. The inventive methods are preferably applied to a wide variety of such gas discharge laser systems.

Overall Laser System

Figure 6:
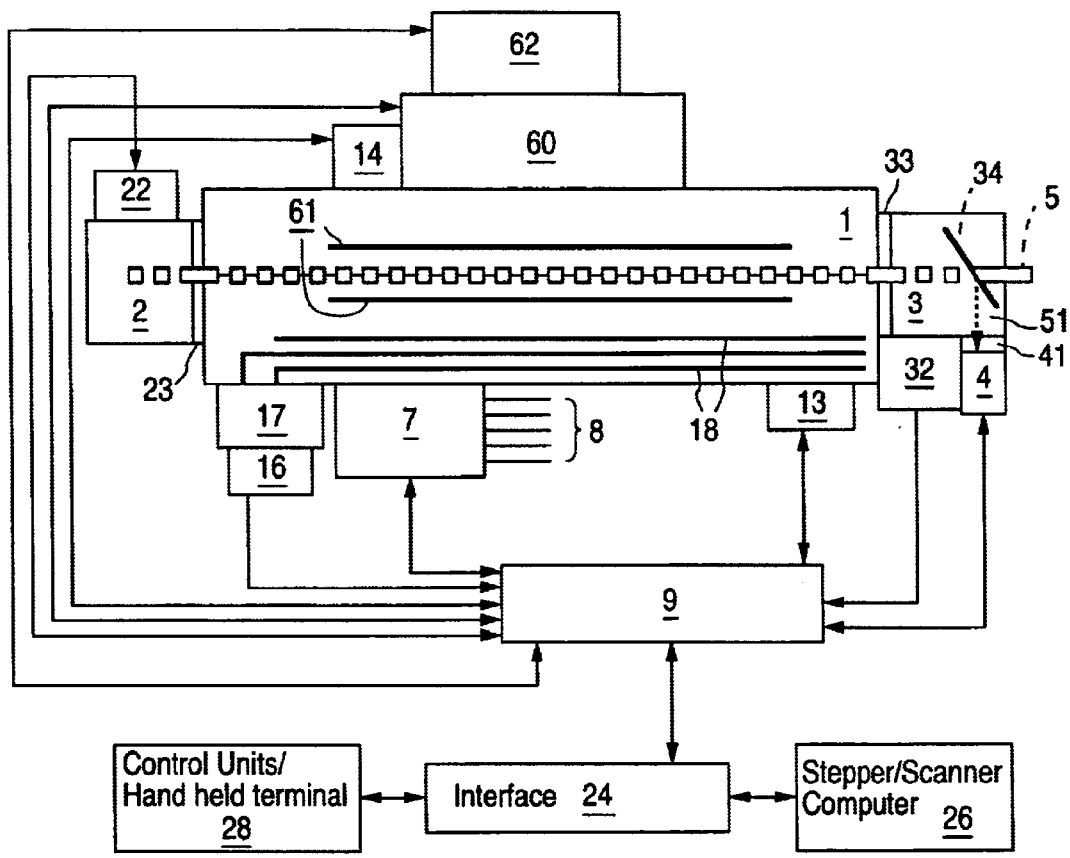
FIG. 6 is a schematic block diagram of a preferred discharge gas laser system having a regulatory feedback loop for controlling the discharge gas composition according to the corona discharge ignition voltage monitoring signal and also having additional laser operational status monitors within the regulation loop.

FIG. 6 schematically illustrates an overall excimer or molecular fluorine laser system according to a preferred embodiment which preferably also includes the advantageous features described above and those described below with reference to FIGS. 4–5 and 13a–13b. Referring to FIG. 6, a preferred excimer or molecular fluorine laser system is a DUV or VUV laser system, such as a KrF, ArF or molecular fluorine ($F_2$) laser system, particularly for use with a deep ultraviolet (DUV) or vacuum ultraviolet (VUV) lithography system. Alternative configurations for laser systems for use in such other industrial applications as TFT annealing, photoablation and/or micromachining, e.g., include configurations understood by those skilled in the art as being similar to and/or modified from the system shown in FIG. 1 to meet the requirements of that application. For this purpose, alternative DUV or VUV laser system and component configurations are described at U.S. patent application Ser. Nos. 09/317,695, 09/130,277, 09/244,554, 09/452,353, 09/512,417, 09/599,130, 09/694,246, 09/712, 877, 09/574,921, 09/738,849, 09/718,809, 09/629,256, 09/712,367, 09/771,366, 09/715,803, 09/738,849, 60/202, 564, 60/204,095, 09/741,465, 09/574,921, 09/734,459, 09/741,465, 09/686,483, 09/584,420, 09/843,604, 09/780, 120, 09/792,622, 09/791,431, 09/811,354, 09/838,715, 09/715,803, 09/717,757, 09/771,013, 09/791,430, 09/712, 367 and 09/780,124, and U.S. Pat. Nos. 6,005,880, 6,061, 382, 6,020,723, 6,219,368, 6,212,214, 6,154,470, 6,157,662, 6,243,405, 6,243,406, 6,198,761, 5,946,337, 6,014,206, 6,157,662, 6,154,470, 6,160,831, 6,160,832, 5,559,816, 4,611,270, 5,761,236, 6,154,470, and 6,157,662, each of which is assigned to the same assignee as the present application and is hereby incorporated by reference.

Discharge Tube

The system shown in FIG. 1 generally includes a laser chamber 1 (or laser tube 1 including a heat exchanger and fan for circulating a gas mixture within the tube or chamber 1) having a pair of main discharge electrodes 61 connected with a solid-state pulser module 60 powered by a power supply 62, and a gas handling module 7. The gas handling module 7 has a valve connection to the laser chamber 1 so that halogen, any active rare gases and a buffer gas or buffer gases, and optionally a gas additive, may be injected or filled into the laser chamber 1, preferably in premixed forms (see U.S. patent application Ser. Nos. 09/513,025, 09/780,120, 09/734,459 and 09/447,882, which are assigned to the same assignee as the present application, and U.S. Pat. Nos. 4,977,573 and 6,157,662, which are each hereby incorporated by reference. The power supply 62 is preferably a high voltage power supply 62 such as may provide several kilovolt pulses to the pulser module 60 and electrodes 61. A thyratron pulser module may alternatively be used. The laser chamber 1 is surrounded by optics module 2 and optics module 3, forming a resonator. The optics modules 2 and 3 may be controlled by an optics control module 22, or may be alternatively directly controlled by a computer or processor 9, particularly when line-narrowing optics are included in one or both of the optics modules 2, 3, such as is preferred when KrF, ArF or $F_2$ lasers are used for optical lithography.

Processor Control

The processor 9 for laser control receives various inputs and controls various operating parameters of the system. A diagnostic module 4 receives and measures one or more parameters, such as pulse energy, average energy and/or power, and preferably wavelength and bandwidth, of a split off portion of the main beam 5 via optics for deflecting a small portion 51 of the beam toward the module 4, such as preferably a beam splitter module 34. The beam 5 is preferably the laser output to an imaging system (not shown) and ultimately to a workpiece (also not shown) such as particularly for lithographic applications, and may be output directly to an application process. The laser control computer 9 may communicate through an interface 24 with a stepper/scanner computer, other control units 26, 28 and/or other external systems.

The processor or control computer 9 receives and processes values of some of the pulse shape, energy, ASE, energy stability, energy overshoot for burst mode operation, wavelength, spectral purity and/or bandwidth, among other input or output parameters of the laser system and output beam. The processor 9 also controls the line narrowing module to tune the wavelength and/or bandwidth or spectral purity to a desired wavelength and/or bandwidth based on spectral information received from a wavelength measurement system, such as that described at U.S. Pat. No. 4,905,243, which is hereby incorporated by reference, and controls the power supply 62 and pulser module 60, and may use a driving voltage meter 14, to control preferably the moving average pulse power or energy such that the energy dose at points on the workpiece is stabilized around a desired value. In addition, the computer 9 controls the gas handling module 7 which includes gas supply valves connected to various gas sources. Further functions of the processor 9 such as to provide overshoot control, energy stability control and/or to monitor input energy to the discharge, are described in more detail at U.S. patent application Ser. No. 09/588,561, which is assigned to the same assignee and is hereby incorporated by reference.

As shown in FIG. 6, the processor 9 preferably communicates with the solid-state or thyratron pulser module 60 and HV power supply 62, separately or in combination, the gas handling module 7, the optics modules 2 and/or 3 and/or optics control module 22, the diagnostic module 4, and an interface 24. The laser resonator includes optics modules 2 and 3 which surround the laser chamber 1 containing the laser gas mixture, and the rear optics module 2 may include line-narrowing optics for a line narrowed excimer or molecular fluorine laser, which may be replaced by a high reflectivity (HR) mirror or the like in a laser system wherein either line-narrowing is not desired, or if line narrowing is performed at the front optics module 3, or if a spectral filter external to the resonator is used for narrowing the bandwidth of the output beam.

Figure 2:
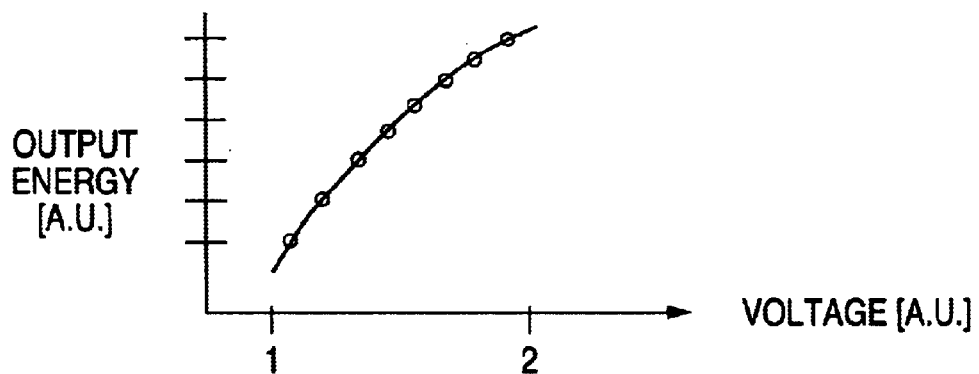
FIG. 2 is a graph depicting for a KrF-excimer laser the relationship between output energy and the voltage of the driving circuit.
Figure 3A:
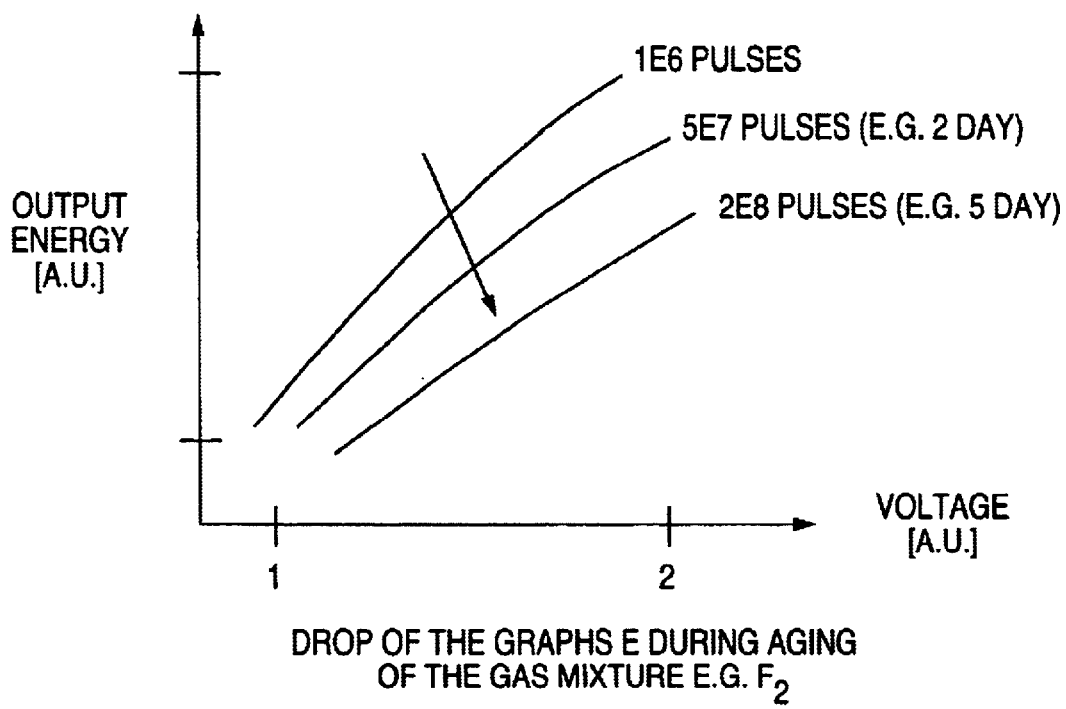
FIG. 3A is a graph depicting the effect of aging of the gas mixture on output energy as a function of the voltage of the driving circuit for a Kr-F excimer laser.
Figure 3B:
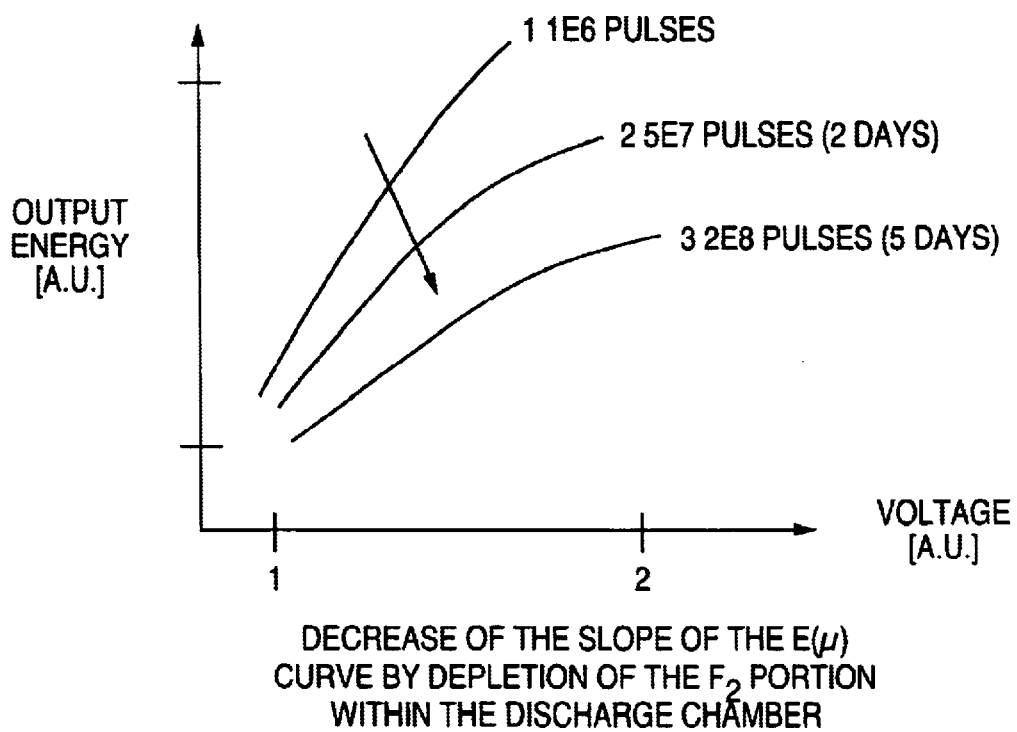
FIG. 3B is a graph depicting the decrease in the slope of the curve relating energy output to the voltage of the driving circuit with depletion of the flourine in the gas mixture of a KrF excimer laser.

The energy of the output beam 5 has a known dependence on driving voltage of the pulse power module (see FIGS. 2, 3A and 3B). The driving energy is typically adjusted during laser operation to control and stabilize the energy of the output beam. In this case, the processor controls the driving voltage based upon the beam energy information received from an energy monitor of the diagnostic module 4. Suitable energy monitors include photodetectors, photodiodes, and pyroelectric detectors.

In accord with the preferred embodiment, the processor 9 also controls the gas adjustment actions of the gas supply unit 7 to stabilize and control the gas mixture composition within the laser tube 1. The gas supply unit 7 receives gas typically from tanks through gas supply lines 8 and gas release lines (not shown) and receives a control signal from the processor 9. The gas supply unit 7 is preferably capable of injecting such very small amounts of a gas or gas mixture into the discharge chamber that the laser output beam characteristics do not vary greatly with each injection. The '459 application mentioned above, e.g., describes such a laser gas replenishment method for an excimer or molecular fluorine laser system. The gas supply unit 7 also includes a port that may be used for releasing gas from the discharge chamber 1.

An advantageous technique for monitoring the gas mixture status by monitoring the corona discharge voltage of the electrostatic precipitator (see FIGS. 4–5) is provided herein. Further advantageously in accord with the preferred embodiment, such gas mixture status monitoring may be performed without variations in several other parameters affecting the analysis. It is also desired that properties of the discharge chamber 1, optics modules 2, 3 and power supply/pulser modules 60, 62, among others, be taken into account by the control unit to provide greater completeness and accuracy as to the overall status of the laser performance. Thus, the laser system of FIG. 6 preferably provides for many other control signals to be transmitted to and from the processor 9, in addition to the input from the corona discharge ignition voltage probe 16 of the electrostatic precipitator having a current stabilized high voltage power supply 17 and electrodes 18.

The laser system of FIG. 6 may also accommodate still additional signals being received and processed by the processor 9 that may be indicative of the laser operational status from other devices 13 monitoring the discharge chamber gas status (e.g., discharge chamber gas temperature and pressure gauges, discharge chamber gas composition monitors) and devices measuring other laser operational status parameters such as a driving voltage meter 14 in addition to the signals from the electrostatic precipitator voltage probe 16. These additional signals would also be received and processed by the processor 9, e.g., in feedback control loops.

Solid State Pulser Module

The laser chamber 1 contains a laser gas mixture and includes one or more preionization electrodes (not shown) in addition to the pair of main discharge electrodes 61. Preferred main electrodes 61 are described at U.S. patent application Ser. No. 09/453,670 for photolithographic applications, which is assigned to the same assignee as the present application and is hereby incorporated by reference, and may be alternatively configured, e.g., when a narrow discharge width is not preferred. Other electrode configurations are set forth at U.S. Pat. Nos. 5,729,565 and 4,860,300, each of which is assigned to the same assignee, and alternative embodiments are set forth at U.S. Pat. Nos. 4,691,322, 5,535,233 and 5,557,629, all of which are hereby incorporated by reference. Preferred preionization units are set forth at U.S. patent application Ser. Nos. 09/692,265 (particularly preferred for KrF, ArF, and $F_2$ lasers), 09/532,276 and 09/247,887, each of which is assigned to the same assignee as the present application, and alternative embodiments are set forth at U.S. Pat. Nos. 5,337,330, 5,818,865 and 5,991,324, all of the above patents and patent applications being hereby incorporated by reference.

The solid-state or thyratron pulser module 60 and high voltage power supply 62 supply electrical energy in compressed electrical pulses to the preionization electrodes (not shown) and main electrodes 61 within the laser chamber 1 to energize the gas mixture. Components of the preferred pulser module and high voltage power supply may be described at U.S. patent application Ser. No. 09/640,595, No. 60/198,058, No. 60/204,095, Ser. Nos. 09/432,348 and 09/390,146, and U.S. Pat. Nos. 6,005,880, 6,226,307 and 6,020,723, each of which is assigned to the same assignee as the present application and which is hereby incorporated by reference into the present application. Other alternative pulser modules are described at U.S. Pat. Nos. 5,982,800, 5,982,795, 5,940,421, 5,914,974, 5,949,806, 5,936,988, 6,028,872, 6,151,346 and 5,729,562, each of which is hereby incorporated by reference.

Laser Resonator

The laser resonator which surrounds the laser chamber 1 containing the laser gas mixture includes optics module 2 preferably including line-narrowing optics for a line narrowed excimer or molecular fluorine laser such as for photolithography, which may be replaced by a high reflectivity mirror or the like in a laser system wherein either line-narrowing is not desired (for TFT annealling, e.g.), or if line narrowing is performed at the front optics module 3, or a spectral filter external to the resonator is used, or if the line-narrowing optics are disposed in front of the HR mirror, for narrowing the bandwidth of the output beam. For an $F_2$-laser, optics for selecting one of multiple lines around 157 nm may be used, e.g., one or more dispersive prisms, birefringent plates or blocks and/or an interferometric device such as an etalon or a device having a pair of opposed, non-parallel plates such as described in the Ser. No. 09/715,803 application, wherein the same optic or optics or an additional line-narrowing optic or optics for narrowing the selected line may be used. Also particularly, for the $F_2$-laser and also possibly for other excimer lasers, the total gas mixture pressure may be lower than conventional systems, e.g., lower than 3 bar, for producing the selected line at a narrow bandwidth such as 0.5 pm or less without using additional line-narrowing optics (see U.S. patent application No. 60/212,301, which is assigned to the same assignee as the present application and is hereby incorporated by reference). The ArF and KrF lasers characteristically emit a broadband spectrum, e.g., more than 400 pm, such that line-narrowing is performed to achieve a narrowband output beam of less than 1 pm, and preferably less than 0.6 pm for photolithographic applications.

The laser chamber 1 is sealed by windows (not shown) transparent to the wavelengths of the emitted laser radiation 5. The windows may be Brewster windows or may be aligned at another angle, e.g., 5°, to the optical path of the resonating beam. One of the windows may also serve to output couple the beam or as a highly reflective resonator reflector on the opposite side of the chamber 1 as the beam is outcoupled.

Diagnostic Module

After a portion of the output beam 5 passes the outcoupler of the optics module 3, that output portion preferably impinges upon a beam splitter module 34 which includes optics for deflecting a portion 51 of the beam to the diagnostic module 4, or otherwise allowing a small portion 51 of the outcoupled beam to reach the diagnostic module 4, while a main beam portion 5 is allowed to continue as the output beam 5 of the laser system (see U.S. patent application Ser. Nos. 09/771,013, 09/598,552, and 09/712,877 which are assigned to the same assignee as the present invention, and U.S. Pat. No. 4,611,270, each of which is hereby incorporated by reference. Preferred optics of the beam splitter module 34 include a beamsplitter or otherwise partially reflecting surface optic. The optics may also include a mirror or beam splitter as a second reflecting optic. More than one beam splitter and/or HR mirror(s), and/or dichroic mirror(s) may be used to direct portions of the beam to components of the diagnostic module 4. A holographic beam sampler, transmission grating, partially transmissive reflection diffraction grating, grism, prism or other refractive, dispersive and/or transmissive optic or optics may also be used to separate a small beam portion from the main beam 5 for detection at the diagnostic module 4, while allowing most of the main beam 5 to reach an application process directly or via an imaging system or otherwise. These optics or additional optics may be used to filter out visible radiation such as the red emission from atomic fluorine in the gas mixture from the split off beam of a molecular fluorine laser prior to detection. Filtering optics may also be included for filtering red light from the output beam 5. Also, an inert gas purge is preferably flowing through the enclosure 41, or the enclosure is substantially evacuated.

The output beam 5 may be transmitted at the beam splitter module 34 while a reflected beam portion 51 is directed at the diagnostic module 4, or the main beam may be reflected, while a small portion is transmitted to the diagnostic module 4. The portion of the outcoupled beam which continues past the beam splitter module 34 is the output beam 5 of the laser, which propagates toward an industrial or experimental application such as an imaging system and workpiece for photolithographic applications.

The diagnostic module 4 preferably includes at least one energy detector. This detector measures the total energy of the beam portion that corresponds directly to the energy of the output beam 5 (see U.S. Pat. Nos. 4,611,270 and 6,212,214 which are hereby incorporated by reference). An optical configuration such as an optical attenuator, e.g., a plate or a coating, or other optics may be formed on or near the detector or beam splitter module 34 to control the intensity, spectral distribution and/or other parameters of the radiation impinging upon the detector (see U.S. patent application Ser. Nos. 09/172,805, 09/741,465, 09/712,877, 09/771,013 and 09/771,366, each of which is assigned to the same assignee as the present application and is hereby incorporated by reference).

One other component of the diagnostic module 4 is a wavelength and/or bandwidth detection component or otherwise as may be referred to as a wavelength measurement system (WMS) such as a monitor etalon or grating spectrometer (see U.S. patent application Ser. Nos. 09/416,344, 09/686,483, and 09/791,431, each of which is assigned to the same assignee as the present application, and U.S. Pat. Nos. 4,905,243, 5,978,391, 5,450,207, 4,926,428, 5,748,346, 5,025,445, 6,160,832, 6,160,831 and 5,978,394, all of the above wavelength and/or bandwidth detection and monitoring components being hereby incorporated by reference). The bandwidth and/or wavelength or other spectral, energy or other beam parameter may be monitored and controlled in a feedback loop including the processor 9 and optics control modules 2, 3, gas handling module 7, power supply and pulser modules 60, 62, or other laser system component modules. In addition, the total pressure of the gas mixture in the laser tube 1 may be controlled to a particular value for producing an output beam at a particular bandwidth and/or energy.

Other components of the diagnostic module may include a pulse shape detector or ASE detector, such as are described at U.S. Pat. Nos. 6,243,405 and 6,243,406 and U.S. patent application Ser. No. 09/842,281, which is assigned to the same assignee as the present application, each of which are hereby incorporated by reference, such as for gas control and/or output beam energy stabilization, or to monitor the amount of amplified spontaneous emission (ASE) within the beam to ensure that the ASE remains below a predetermined level. There may be a beam alignment monitor, e.g., such as is described at U.S. Pat. No. 6,014,206, or beam profile monitor, e.g., U.S. patent application Ser. No. 09/780,124, which is assigned to the same assignee, wherein each of these patent documents is hereby incorporated by reference.

Beam Path Enclosures

Particularly for the molecular fluorine laser system, and for the ArF laser system, an enclosure (not shown) preferably seals the beam path of the beam 5 exiting the laser such as to keep the beam path free of photoabsorbing species. Smaller enclosures 23, 33 preferably seal the beam path between the chamber 1 and the optics modules 2 and 3, respectively, and an enclosure 41 is preferably disposed between the beam splitter module 34 and the diagnostic module 4, and the diagnostic module 4 and beam splitter module 34 may be included in a same housing so that the enclosure 41 would not be used. The beam path between the laser chamber 1 and each of the optics modules 2 and 3 is sealed by an enclosure 23 and 33, respectively, such that the interiors of the enclosures 23, 33 are maintained substantially free of water vapor, oxygen, hydrocarbons, fluorocarbons and the like which otherwise strongly absorb laser radiation below 200 nm. The optics modules 2 and 3 are preferably maintained in an atmosphere that is sufficiently evacuated or have an inert gas purged atmosphere, as well. Preferred enclosures are described in detail in U.S. patent application Ser. Nos. 09/598,552, 09/594,892, 09/727,600, 09/317,695 and 09/131,580, which are assigned to the same assignee and are hereby incorporated by reference, and U.S. Pat. Nos. 6,219,368, 5,559,584, 5,221,823, 5,763,855, 5,811,753 and 4,616,908, all of which are hereby incorporated by reference.

Gas Mixture

The laser gas mixture is initially filled into the laser chamber 1 in a process referred to herein as a "new fills". In such procedure, the laser tube is evacuated of laser gases and contaminants, and re-filled with an ideal gas composition of fresh gas. The gas composition for a very stable excimer or molecular fluorine laser in accord with the preferred embodiment uses helium or neon or a mixture of helium and neon as buffer gas(es), depending on the particular laser being used. Preferred gas compositions are described at U.S. Pat. Nos. 4,393,405, 6,157,162, 6,243,406 and 4,977,573 and U.S. patent application Ser. Nos. 09/513,025, 09/447,882, and 09/588,561, each of which is assigned to the same assignee and is hereby incorporated by reference into the present application. The concentration of the fluorine in the gas mixture may range from 0.003% to 1.00%, and is preferably around 0.1%. The partial pressure of the fluorine in the gas mixture may range from 0.05 mbar to 30 mbar, and is preferably around 3 mbar.

An additional gas additive, such as a rare gas or otherwise, may be added for increased energy stability, overshoot control and/or as an attenuator as described in the Ser. No. 09/513,025 application incorporated by reference above. Specifically, for the $F_2$-laser, an addition of xenon, krypton and/or argon may be used. The concentration of xenon or argon in the mixture may range from 0.0001% to 0.1%. For an ArF-laser, an addition of xenon or krypton may be used also having a concentration between 0.0001% to 0.1%. For the KrF laser, an addition of xenon or argon may be used also having a concentration between 0.0001% to 0.1%. Gas replenishment actions are described below for gas mixture compositions of systems such as ArF, KrF, and XeCl excimer lasers and molecular fluorine lasers, wherein the ideas set forth herein may be advantageously incorporated into any of these systems, and other gas discharge laser systems.

Gas Replenishment

Halogen gas injections, including micro-halogen injections of, e.g., 1–3 milliliters of halogen gas, mixed with, e.g., 20–60 milliliters of buffer gas or a mixture of the halogen gas, the buffer gas and a active rare gas for rare gas-halide excimer lasers, per injection for a total gas volume in the laser tube 1 of, e.g., 100 liters, total pressure adjustments and gas replacement procedures may be performed using the gas handling module 7 preferably including a vacuum pump, a valve network and one or more gas compartments. The gas handling module 7 receives gas via gas lines connected to gas containers, tanks, canisters and/or bottles. Some preferred and alternative gas handling and/or replenishment procedures are described at U.S. Pat. Nos. 4,977,573, 6,212,214, 6,243,406 and 5,396,514 and U.S. patent application Ser. Nos. 09/447,882, 09/734,459, 09/513,025 and 09/588,561, each of which is assigned to the same assignee as the present application, and U.S. Pat. Nos. 5,978,406, 6,014,398 and 6,028,880, all of which are hereby incorporated by reference. A xenon gas or other gas additive supply may be included either internal or external to the laser system according to the '025 application, mentioned above.

Total pressure adjustments in the form of releases of gases or reduction of the total pressure within the laser tube 1 may also be performed. Total pressure adjustments may be followed by gas composition adjustments if it is determined that, e.g., other than the desired partial pressure of halogen gas is within the laser tube 1 after the total pressure adjustment. Total pressure adjustments may also be performed after gas replenishment actions, and may be performed in combination with smaller adjustments of the driving voltage to the discharge than would be made if no pressure adjustments were performed in combination.

Gas replacement procedures may be performed and may be referred to as partial, mini- or macro-gas replacement operations, or partial new fill operations, depending on the amount of gas replaced, e.g., anywhere from a few milliliters up to 50 liters or more, but less than a new fill, such as are set forth in the Ser. No. 09/734,459 application, incorporated by reference above. As an example, the gas handling unit 7 connected to the laser tube 1 either directly or through an additional valve assembly, such as may include a small compartment for regulating the amount of gas injected (see the '459 application), may include a gas line for injecting a premix A including 1%$F_2$:99%Ne or other buffer gas such as He, and another gas line for injecting a premix B including 1% rare gas:99% buffer gas, for a rare gas-halide excimer laser, wherein for a $F_2$ laser premix B is not used. Other combinations such as 5%:95% of the premixes may be used. Another line may be used for injecting a gas additive or gas additive premix, or a gas additive may be added to premix A, premix B or a buffer gas. Another line may be used for total pressure additions or reductions, i.e., for flowing buffer gas into the laser tube 1 or allowing some of the gas mixture in the tube 1 to be released, possibly accompanying halogen injections for maintaining the halogen concentration. Thus, by injecting premix A (and premix B for rare gas-halide excimer lasers) into the tube 1 via the valve assembly, the fluorine concentration in the laser tube 1 may be replenished. Then, a certain amount of gas may be released corresponding to the amount that was injected to maintain the total pressure at a selected level. Additional gas lines and/or valves may be used for injecting additional gas mixtures. New fills, partial and mini gas replacements and gas injection procedures, e.g., enhanced and ordinary micro-halogen injections, such as between 1 milliliter or less and 3–10 milliliters, or more depending on the degree of stability desired, and any and all other gas replenishment actions are initiated and controlled by the processor 9 which controls valve assemblies of the gas handling unit 7 and the laser tube 1 based on various input information in a feedback loop. These gas replenishment procedures may be used in combination with gas circulation loops and/or window replacement procedures to achieve a laser system having an increased servicing interval for both the gas mixture and the laser tube windows.

In a preferred technique, an expert system is used including a database of information and graphs corresponding to different gas mixtures and laser operating conditions (see the '214 patent, mentioned above). A data set of driving voltage versus output pulse energy, e.g., is measured and compared to a stored "master" data set corresponding to an optimal gas composition such as may be present in the discharge chamber after a new fill. From a comparison of values of the data sets and/or the slopes of graphs generated from the data sets, a present gas mixture status and appropriate gas replenishment procedures, if any, may be determined and undertaken to reoptimize the gas mixture.

Most conventional techniques generally produce some disturbances in laser operation conditions when the gas is replenished. For example, strong pronounced jumps of the driving voltage are produced as a result of macro-halogen injections (macro-HI) (macro-HI are distinguished from micro-halogen injections ($\mu$HI) as described in the '882 application). A result of a macro-HI may be a strong distortion of meaningful output beam parameters such as the pulse-to-pulse stability. By contrast, a series of small gas injections, or $\mu$HI, can be used to return any constituent gas of an excimer, molecular, or molecular fluorine laser, particularly the very active halogen, to its optimal concentration in the discharge chamber 1 without disturbing significant output beam parameters. For this reason, for some macro-halogen operations, the laser is typically shut down and restarted for gas replenishment, remarkably reducing laser uptime.

The '882 application referred to above provides a preferred technique wherein gas replenishment is performed for maintaining constant gas mixture conditions without disturbing significant output beam parameters. The '882 application describes a gas discharge laser system which has a discharge chamber containing a gas mixture including a constituent halogen-containing species, a pair of electrodes connected to a power supply circuit including a driving voltage for energizing the first gas mixture, and a resonator surrounding the discharge chamber for generating a laser beam.

The partial pressure of the halogen containing-species in the gas mixture is increased by an amount preferably less than 0.2 mbar, as a result of each successive injection. The gaseous composition of the injected gas is preferably 1%–5% of the halogen-containing gas and 95%–99% buffer gas, so that the overall pressure in the discharge chamber increases by less than 20 mbar, and preferably less than 10 mbar per gas injection.

The processor monitors the corona discharge ignition voltage of the electrostatic precipitator which is indicative of the partial pressure of the halogen-containing gas and varies with a known correspondence to the partial pressure of the halogen gas. The small gas injections each produce only small variations in partial pressure of the halogen gas in the gas mixture of the laser tube, and thus discontinuities in laser output beam parameters are reduced or altogether avoided.

In the system of FIG. 6, as discussed above, the processor 9 preferably applies algorithms to generate its control signals based upon input signals from the electrostatic precipitator voltage probe 16 and other system status monitors. These algorithms may utilize reference values for the monitor signals and information based upon the history of past gas actions signals to generate control signals. These control signals are received by the gas supply unit 7 which regulates the flow of replenishment gases from the supply lines 8 to the discharge chamber 1 and any release of the discharge chamber gas mixture according to said control signal from the processor 9.

In the laser system of FIG. 6, an exemplary regulation procedure may work as follows:

The corona discharge ignition voltage at the electrostatic precipitator is measured by the probe just after a new gas fill. This value preferably serves as a reference value. A procedure would be to maintain this value (or within a narrow range) by $\mu$HI's or other smoothed gas actions over the gas life time. A re-calibration (e.g., determination of the corona ignition discharge voltage for a laser gas mixture just after a new fill) may be carried out from time to time, e.g., after successive new fill.

The signal from the laser energy output monitor 4 preferably provides information on the laser's operational status based upon the output beam characteristics. The signal from the device 16 measuring the status of the electrostatic precipitator discharge corona voltage provides information on the discharge chamber gas status. The computer 9 provides an algorithm, any reference input values or settings, including a database about the dependence of the laser energy output parameters on the charging voltage for different gas mixtures. The information from the two signals are then processed by the processor 9 to assess the source of any variation in laser operations and determine the gas actions needed to stabilize laser output.

In the laser system of FIG. 6, the processor 9 preferably also can provide signals which adjust the driving voltage applied by the electrical pulse power 62 and discharge module 60 to further stabilize the laser output. The excimer or molecular fluorine laser system of FIG. 6, however, also preferably provides additional information (e.g. signals reporting on driving voltage and power utilization, gas mixture composition, gas temperature and pressure) to the processor 9 for a more particularized determination of the optimal actions (gas mixture composition adjustment actions, driving voltage changes) needed to maintain a stable laser beam output. Oscilloscopes, voltmeter, and galvanometers may be used to monitor the driving voltages.

Line Narrowing

A general description of the line-narrowing features of embodiments of the laser system particularly for use with photolithographic applications is provided here, followed by a listing of patent and patent applications being incorporated by reference as describing variations and features that may be used within the scope of the preferred embodiments herein for providing an output beam with a high spectral purity or bandwidth (e.g., below 1 pm and preferably 0.6 pm or 0.5 pm or less). These exemplary embodiments may be used for KrF and ArF lasers for narrowing the broadband characteristic emission spectra of those lasers, or for a molecular fluorine laser, e.g., selecting the primary line $\lambda_1$ only, or may be used to provide additional line narrowing as well as performing line-selection, or the resonator may include optics for line-selection and additional optics for line-narrowing of the selected line of the molecular fluorine laser, and line-narrowing may be provided by controlling (i.e., reducing) the total pressure (see U.S. patent application No. 60/212,301, which is assigned to the same assignee and is hereby incorporated by reference).

Exemplary line-narrowing optics contained in the optics module 2 or 3 include a beam expander, an optional interferometric device such as an etalon or a device having a pair of opposed non-planar reflection plates such as may be described in the Ser. No. 09/715,803 or No. 60/280,398, which are assigned to the same assignee as the present application and are hereby incorporated by reference, and a diffraction grating, and alternatively one or more dispersion prisms may be used, wherein the grating would produce a relatively higher degree of dispersion than the prisms, for a narrow band laser such as is used with a refractive or catadioptric optical lithography imaging system. As mentioned above, the front optics module 3 may include line-narrowing optics such as may be described in any of the Ser. Nos. 09/715,803, 09/738,849, and 09/718,809, each being assigned to the same assignee and hereby incorporated by reference.

Instead of having a retro-reflective grating in the rear optics module 2, the grating may be replaced with a highly reflective mirror, and a lower degree of dispersion may be produced by a dispersive prism, or a beam expander and an interferometric device such as an etalon or device having non-planar opposed plates may be used for line-selection and narrowing, or alternatively no line-narrowing or line-selection may be performed in the rear optics module 2. In the case of using an all-reflective imaging system, the laser may be configured for semi-narrow band operation such as having an output beam linewidth in excess of 0.6 pm, depending on the characteristic broadband bandwidth of the laser, such that additional line-narrowing of the selected line would not be used, either provided by optics or by reducing the total pressure in the laser tube.

If a beam expander is used with line-narrowing optics of the optics module 2 or 3, the beam expander preferably includes one or more prisms. The beam expander may include other beam expanding optics such as a lens assembly or a converging/diverging lens pair. The grating or a highly reflective mirror is preferably rotatable so that the wavelengths reflected into the acceptance angle of the resonator can be selected or tuned. Alternatively, the grating, or other optic or optics, or the entire line-narrowing module may be pressure tuned, such as is set forth in the Ser. No. 09/771,366 and the U.S. Pat. No. 6,154,470, each of which is assigned to the same assignee and is hereby incorporated by reference. The grating may be used both for dispersing the beam for achieving narrow bandwidths and also preferably for retroreflecting the beam back toward the laser tube. Alternatively, a highly reflective mirror is positioned after the grating which receives a reflection from the grating and reflects the beam back toward the grating in a Littman configuration, or the grating may be a transmission grating. One or more dispersive prisms may also be used, and more than one etalon or other interferometric device may be used.

Depending on the type and extent of line-narrowing and/or selection and tuning that is desired, and the particular laser that the line-narrowing optics are to be installed into, there are many alternative optical configurations that may be used. For this purpose, those shown in U.S. Pat. Nos. 4,399,540, 4,905,243, 5,226,050, 5,559,816, 5,659,419, 5,663,973, 5,761,236, 6,081,542, 6,061,382, 6,154,470, 5,946,337, 5,095,492, 5,684,822, 5,835,520, 5,852,627, 5,856,991, 5,898,725, 5,901,163, 5,917,849, 5,970,082, 5,404,366, 4,975,919, 5,142,543, 5,596,596, 5,802,094, 4,856,018, 5,970,082, 5,978,409, 5,999,318, 5,150,370 and 4,829,536, and German patent DE 298 22 090.3, and any of the patent applications mentioned above and below herein, may be consulted to obtain a line-narrowing configuration that may be used with a preferred laser system herein, and each of these patent references is each hereby incorporated by reference into the present application.

Additional Laser System Features

Optics module 3 preferably includes means for outcoupling the beam 5, such as a partially reflective resonator reflector. The beam 5 may be otherwise outcoupled such as by an intra-resonator beam splitter or partially reflecting surface of another optical element, and the optics module 3 would in this case include a highly reflective mirror. The optics control module 22 preferably controls the optics modules 2 and 3 such as by receiving and interpreting signals from the processor 9, and initiating realignment, gas pressure adjustments in the modules 2, 3, or reconfiguration procedures (see the '353, '695, '277, '554, and '527 applications mentioned above).

The halogen concentration in the gas mixture is maintained constant during laser operation by gas replenishment actions by replenishing the amount of halogen in the laser tube for the preferred excimer or molecular fluorine laser herein, such that these gases are maintained in a same predetermined ratio as are in the laser tube 1 following a new fill procedure. In addition, gas injection actions such as $\mu$HIs as understood from the '882 application, mentioned above, may be advantageously modified into micro gas replacement procedures, such that the increase in energy of the output laser beam may be compensated by reducing the total pressure. In addition, the laser system is preferably configured for controlling the input driving voltage so that the energy of the output beam is at the predetermined desired energy. The driving voltage is preferably maintained within a small range around $HV_{opt}$, while the gas procedure operates to replenish the gases and maintain the average pulse energy or energy dose, such as by controlling an output rate of change of the gas mixture or a rate of gas flow through the laser tube 1. Advantageously, the gas procedures set forth herein permit the laser system to operate within a very small range around $HV_{opt}$, while still achieving average pulse energy control and gas replenishment, and increasing the gas mixture lifetime or time between new fills (see U.S. patent application Ser. No. 09/780,120, which is assigned to the same assignee as the present application and is hereby incorporated by reference).

In all of the above and below embodiments, the material used for any dispersive prisms, the prisms of any beam expanders, etalons or other interferometric devices, laser windows and the outcoupler for ArF or $F_2$ lasers is preferably one that is highly transparent at wavelengths below 200 nm, such as at the 157 nm output emission wavelength of the molecular fluorine laser or the 193 nm emission of the ArF laser. The materials are also capable of withstanding long-term exposure to ultraviolet light with minimal degradation effects. Examples of such materials are $CaF_2$, $MgF_2$, $BaF_2$, LiF and $SrF_2$, and in some cases fluorine-doped quartz may be used. Also, in all of the embodiments, many optical surfaces, particularly those of the prisms, may or may not have an anti-reflective coating on one or more optical surfaces, in order to minimize reflection losses and prolong their lifetime. Some other materials are available such as fused silica for use with the KrF laser which emits a beam at around 248 nm, although the same materials, e.g., $CaF_2$ may be used with the KrF laser, as well.

Also, the gas composition for the excimer or molecular fluorine laser in the above configurations uses either helium, neon, or a mixture of helium and neon as a buffer gas. For rare gas-halide excimer lasers, the rare gas is preferably maintained at a concentration of around 1.0% in the gas mixture. The concentration of fluorine in the gas mixture preferably ranges from 0.003% to around 1.0%, and is preferably around 0.1%. However, if the total pressure is reduced for narrowing the bandwidth, then the fluorine concentration may be higher than 0.1%, such as may be maintained between 1 and 7 mbar, and more preferably around 3–5 mbar, notwithstanding the total pressure in the tube or the percentage concentration of the halogen in the gas mixture. The addition of a trace amount of xenon, and/or argon, and/or oxygen, and/or krypton and/or other gases (see the '025 application) may be used for increasing the energy stability, burst control, and/or output energy of the laser beam. The concentration of xenon, argon, oxygen, or krypton in the mixture as a gas additive may range from 0.0001% to 0.1%, and would be preferably significantly below 0.1%. Some alternative gas configurations including trace gas additives are set forth at U.S. patent application Ser. No. 09/513,025 and U.S. Pat. No. 6,157,662, each of which is assigned to the same assignee and is hereby incorporated by reference.

A line-narrowed oscillator, e.g., a set forth above, may be followed by a power amplifier for increasing the power of the beam output by the oscillator. Preferred features of the oscillator-amplifier set-up are set forth at U.S. patent application Ser. No. 09/599,130 and No. 60/228,184, which are assigned to the same assignee and are hereby incorporated by reference. The amplifier may be the same or a separate discharge chamber 1. An optical or electrical delay may be used to time the electrical discharge at the amplifier with the reaching of the optical pulse from the oscillator at the amplifier. With particular respect to the $F_2$-laser, a molecular fluorine laser oscillator may have an advantageous output coupler having a transmission interference maximum at $\lambda_1$ and a minimum at $\lambda_2$. A 157 nm beam is output from the output coupler and is incident at the amplifier of this embodiment to increase the power of the beam. Thus, a very narrow bandwidth beam is achieved with high suppression of the secondary line $\lambda_2$ and high power (at least several Watts to more than 10 Watts).

As described above with reference to FIGS. 4 and 5, in a preferred embodiment, the corona discharge ignition voltage of the gas mixture is measured at the electrostatic precipitator. In another preferred embodiment, the processor 9 computes a dc-breakdown voltage value based upon the frequency of the dc-breakdown voltage signal measured at the electrostatic precipitator according to U.S. patent application Ser. No. 09/583,037, which is assigned to the same assignee as this application and is hereby incorporated by reference.

The processor 9 also controls the electrical energy supplied to the electrodes 61 via the power supply 62 and pulser module 60 to control preferably the moving average pulse power or energy, such that the energy dose at points on the workpiece is stabilized around a desired value. In addition, the processor 9 controls the gas handling module 7 which includes gas supply valves connected to various gas sources. The processor 9 may also receive values of the bandwidth from a spectrometer of the diagnostic module 4 and control the total pressure in the discharge chamber 1 to provide a stable and selected bandwidth of the output beam 5.

Experimental Results

The sensitivity and capability of a corona discharge ignition voltage signal and monitoring probe of the preferred embodiment have been explored using a standard KrF lithography laser. The composition of the laser gas during the measurements was changed from an initial composition by addition of a small amount of a premix containing about 1% of fluorine, balance neon. Upon the addition of 20 microinjections of halogen ($\mu$HI) the value of the voltage across the electrostatic filter electrodes was changed from 2.060 to 2.081 KV. Assuming the voltage difference was essentially all due to the change in the fluorine concentration, the responsiveness was judged to be about 1 V per $\mu$HI.

The sensitivity of this apparatus and method was assessed by introduction into a laser fixed amounts of the test gases: Premix A (0.95% fluorine, 1.25% krypton, Neon balance); Premix B (1.25% krypton in neon); and Premix C (1.4% xenon in neon). Each percentage was approximate as the actual concentrations of the gases were not analytically confirmed. It was determined that the method sensitivities were approximately: 0.81 mV/mBar for Premix A; 0.31 mV/mBar for Premix B; and −0.1 to −0.2 mV/mBar for Premix C. As is evident from these results, the addition of Xe could even reduce the measured voltage.

Further experiments (see FIGS. 7–12) were conducted to assess an apparatus and a method of measuring the corona discharge ignition voltage of the electrostatic precipitator. In these experiments, a standard, narrow band, gas filled, KrF laser was used. A voltage probe according to the circuit of FIG. 4 included a R resistor with a resistance of 10 MΩ and also included a resistor r with a resistance of 10 KΩ. The high voltage power supply was current stabilized. In FIGS. 7–12, the measurements were performed at six second intervals (black line) and the white line represents averaging over one minute (10 measurements).

While the electrical signal was relatively "noisy", further improvements in signal handling or filtering, which may be understood by those skilled in the art, could be incorporated to improve the signal quality. Further, other arrangements of the voltage probe, as also may be understood by those skilled in the art, could be also incorporated to provide a better signal quality from the corona discharge ignition voltage probe.

Figure 7:
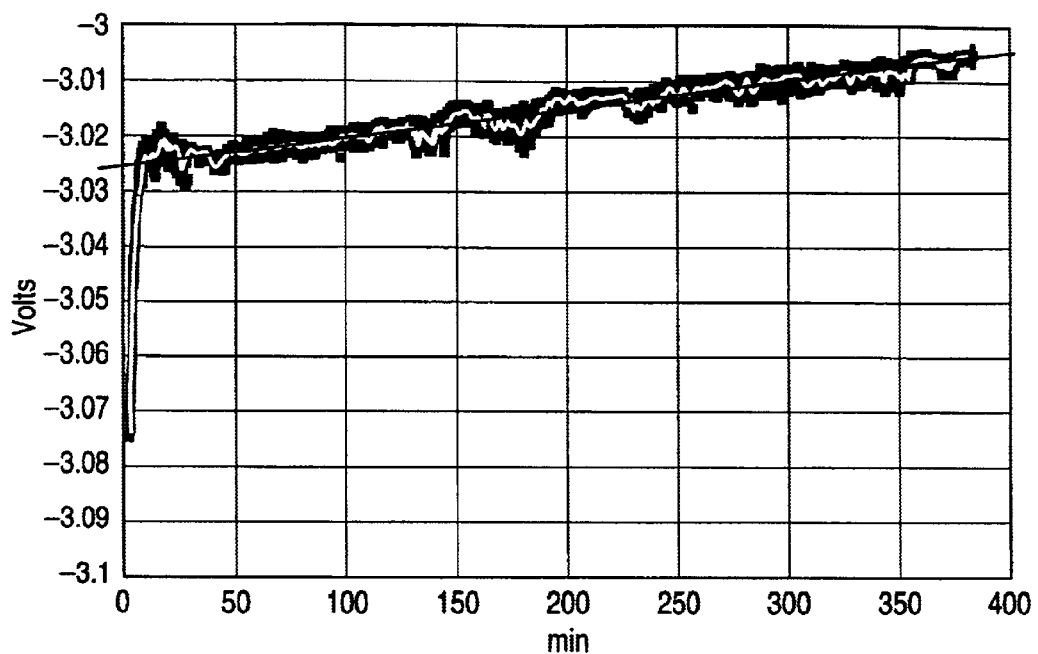
FIG. 7 is a graph describing the history of the corona discharge ignition voltage at the electrostatic precipitator over 6 hours of continuous operation (1.8 KV and 2 KHz) of a KrF laser without any microhalogen injections ($\mu$HI) or partial gas replenishment actions.

FIG. 7 presents probe monitoring data for the corona discharge voltage over the course of six hours of continuous operation of a KrF laser operating at 1.8 kV and 2 kHz without any μHI injections or gas replenishment actions. The voltage difference observed during the course of six hours was about 20 mV or 0.46 mV per million pulses. The results indicate that the signal would be useful in monitoring the status of the laser discharge gas status.

Figure 8:
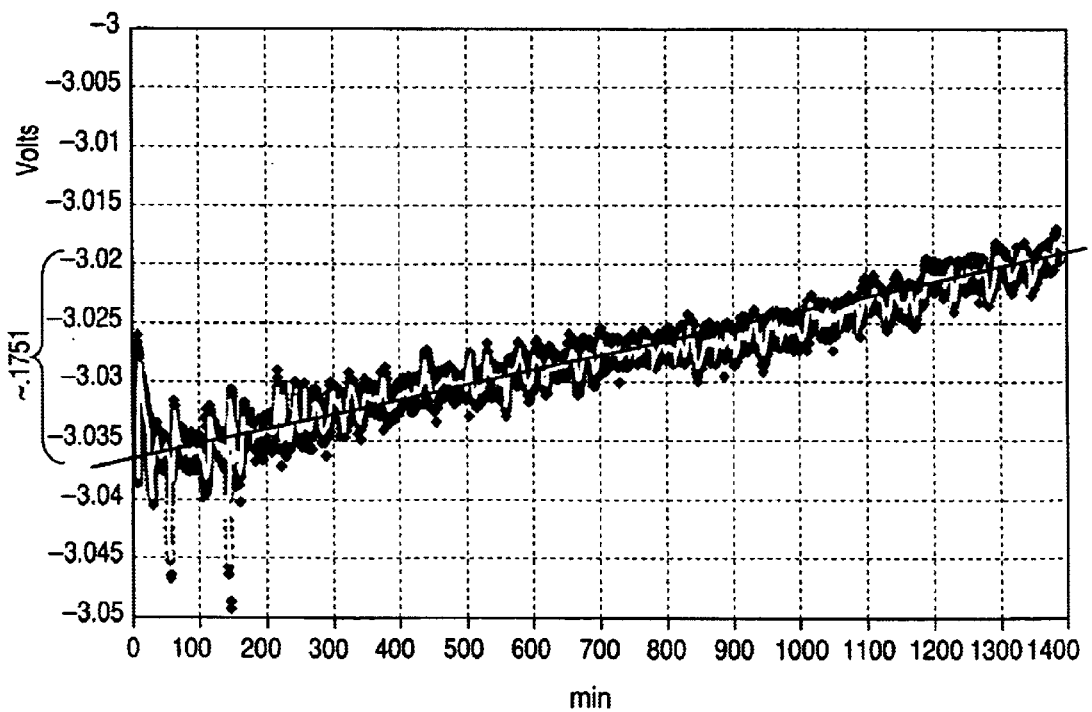
FIG. 8 is a graph of the corona discharge ignition voltage at the electrostatic precipitator over 23 hours for a KrF laser operating in burst mode (1.8 KV, 2 KHz) without any $\mu$HI or partial gas replenishment actions.

FIG. 8 shows electrostatic precipitator corona discharge voltage data for a laser operating in burst mode at 1.8 kV and 2 kHz without μHI injections or gas replenishment actions. After continuous operation of about 23 hours (51.8 million pulses) the drop of the laser pulse energy was below 25% and the change in the measured voltage was approximately 0.34 mV per million pulses.

Figure 9:
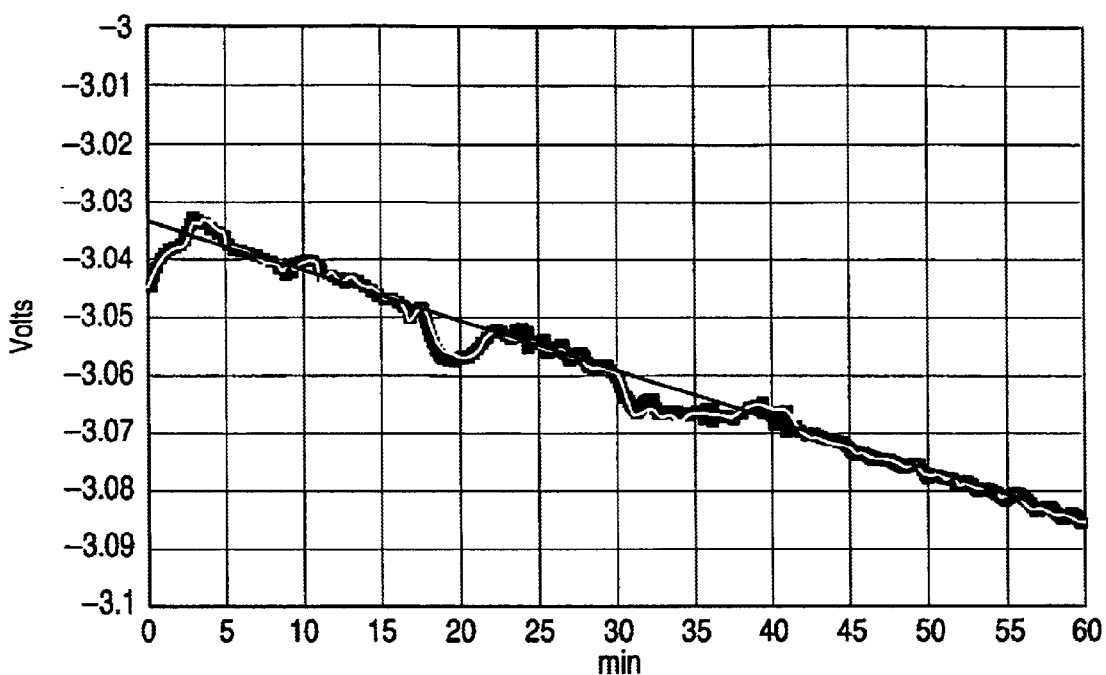
FIG. 9 is a graph of the corona discharge ignition voltage monitoring data for a KrF laser operating continuously at 1.8 KV and 1 KHz for 1 hour with replenishment of the laser gas by microhalogen injections ($\mu$HI) and without partial gas replacements.
Figure 10:
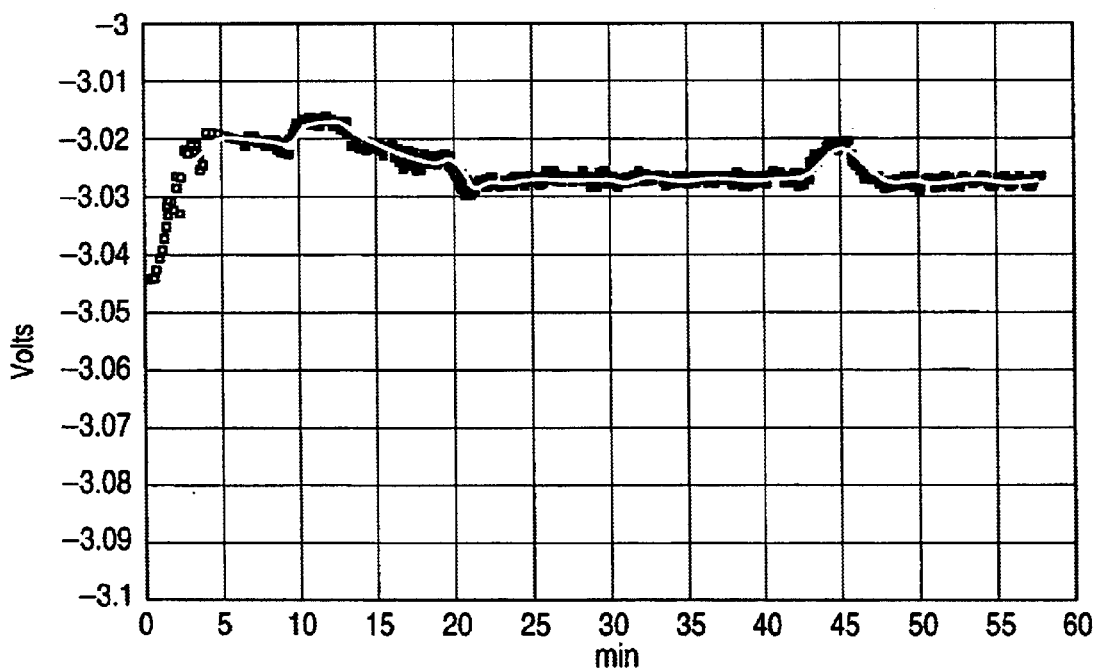
FIG. 10 is a control graph of the corona discharge ignition voltage monitoring data for a KrF laser operating continuously at 1.8 KV and 1 KHz for 1 hour without replenishment of the laser gas by $\mu$HI or partial gas replacement actions.

FIG. 9 provides monitoring data for a laser operating continuously at 1.8 KV and 1 KHz with replenishment by μHI given at a rate of one μHI every two minutes for one hour, a comparatively short term compared to the above tests. Under these conditions, the direction of the drift in the voltage measurement is reversed and the rate of change is about 0.85 mV per minute or 1.7 mV/μHI. These results can be contrasted to those represented in FIG. 10. In the test performed for generating FIG. 10, a similar laser operating continuously at 1.8 KV and 1 KHz but without replenishment by μHI was monitored for one hour. Under these conditions, without gas replenishment actions, the monitored corona discharge ignition voltage held essentially constant for a one hour period. The results indicate that the method is sufficiently sensitive to monitor the gas status changes associated with repeated μHIs.

Figure 11:
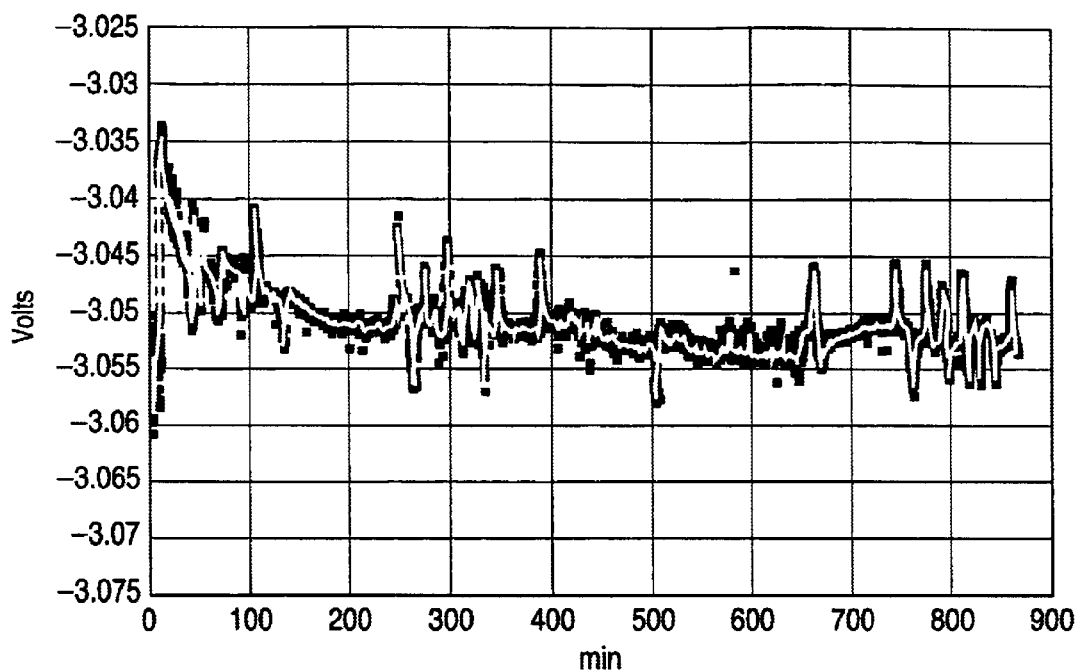
FIG. 11 is a graph presenting the corona discharge ignition voltage monitoring results for a long term (15 hours) continuous KrF laser operation without $\mu$HI or partial gas replacement actions.

FIG. 11 presents the monitoring results for long term (15 hours) continuous laser operation at 1.8 kV and 1 kHz without μHI injections or other gas replenishment actions. A typical feature of the measured voltage was a relatively strong dependence on the temperature of the laser tube. This dependence could explain the slow drift over time in FIGS. 10 and 11.

Figure 12:
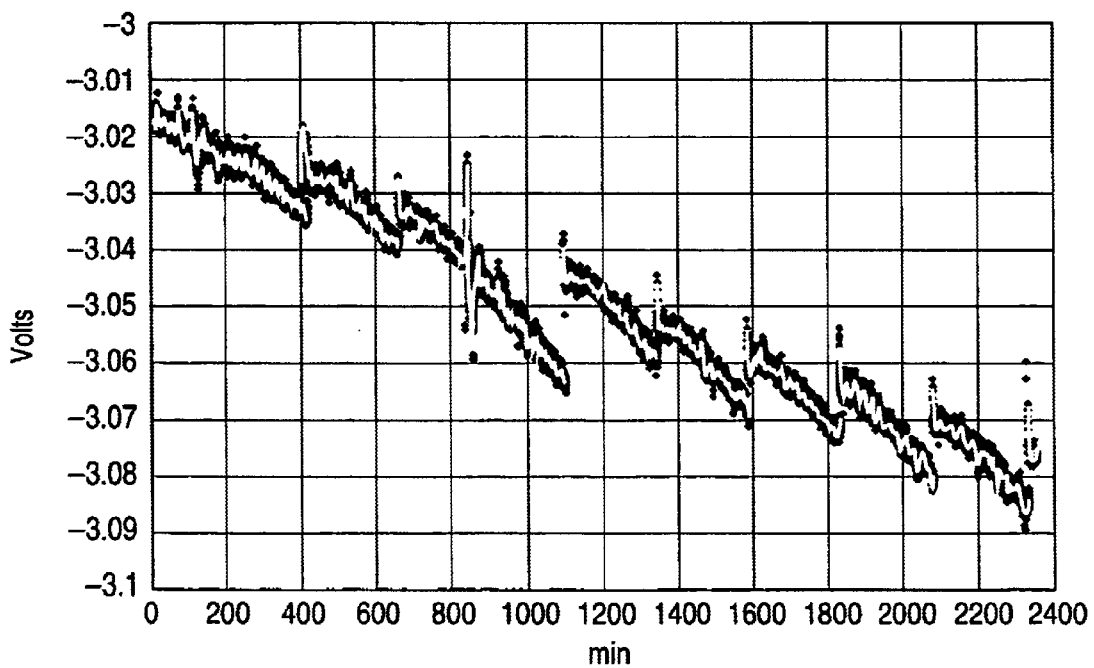
FIG. 12 is a graph of the corona discharge voltage monitoring data obtained over 40 hours of operation of a KrF laser with gas replenishment actions including $\mu$HI and partial gas replacement.

FIG. 12 provides the results from a long run, burst operation of a laser system with usual μHI and partial gas replenishment actions. As can be seen from the tracing, the voltage monitor did detect the gas replenishment actions over a 40 hour period.

The preferred embodiments herein therefore provide a signal which is directly related to the status of the gas mixture of a gas discharge laser. This signal is sufficiently responsive to the gas status as to be useful in guiding discharge gas control or discharge gas adjustment actions as the discharge gas "ages" over time.

Elongated Gas Removal Pipe

Figure 13A:
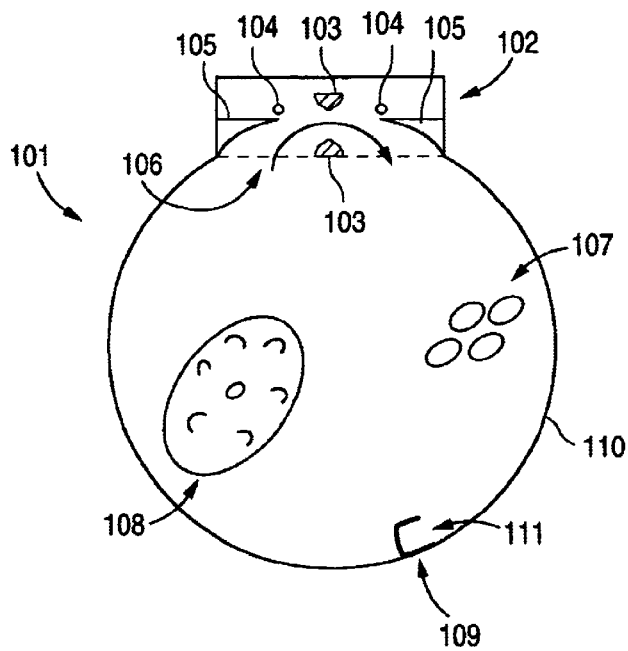
FIG. 13a schematically shows a cross section of an excimer or molecular fluorine laser tube including an elongated tube with a slit for use with a gas precipitator loop for cleaning the laser tube windows in accordance with a preferred embodiment.

FIG. 13a schematically shows a cross section of an excimer or molecular fluorine laser including an elongated tube 109 with a slit 111 for use with a gas precipitator loop for cleaning the laser tube windows in accordance with an additional or alternative embodiment. The tube 109 may also be used in new fill procedures for sweeping away particulates within the laser tube 101. FIG. 13a shows a cross-section of a laser tube 101 having a discharge chamber 102 with main electrodes 103 and one or two or more preionization electrodes 104, and a pair of spoiler elements 105 for forming the gas flow through the discharge chamber 102, and current return conductor 106 connected preferably to the grounded main electrode 103. The design is preferably the same or similar to that which is described in U.S. patent application Ser. No. 09/453,670, which is assigned to the same assignee as the present application and is hereby incorporated by reference. The remainder of the laser tube 101 includes a heat exchanger 107 and a blower 108.

In addition, an elongated tube, pipe or partially tubular component (hereinafter pipe 109) is disposed in the laser tube 101 and preferably attached to the laser tube housing 110 and preferably near the blower 108 which circulates the laser gas. The pipe 109 has an elongated slit 111 or opening along its length and preferably facing the gas flow and preferably longer than the discharge length (wherein the discharge length is approximately the length of the electrodes 103). Laser gas goes into the pipe 109 through the slit 111 and is thereby passed through the electrostatic precipitator loop. Again, the tube 109 is used for removing an aged gas mixture from the chamber 101. In this case, the blower 108 is preferably running and particulates flow into the slit 111 with the gas and are removed from the chamber 101.

Figure 13B:
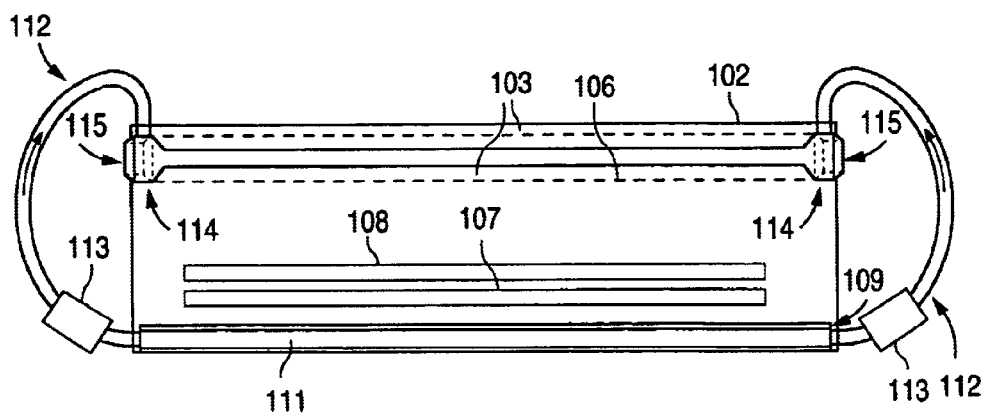

FIG. 13b shows a side view of the laser tube 101 including the electrodes 103 in the discharge chamber 102 with current return conductor 106, and the heat exchanger 107 and blower 108 in the gas reservoir region of the laser tube 101. The pipe 109 and slit 111 are shown each extending along the length of the laser tube 101. Gas removed from the laser tube 101 through the slit 111 in the pipe 109 flows through gas flow tubing 112, electrostatic precipitator 113, and eventually into a baffle box structure 114 around the laser tube windows 115, wherein a steady flow of gas cleaned in the precipitator loop flows past the windows 115 to keep them clean. Again, the tube 109 may be used other than within the gas precipitator loop, such that the gas and particulates sucked into the tube 109 through the slit 111 are removed from the chamber 101 and may be flowed into a waste container or otherwise.

The pipe 109 is preferably around 8 mm in diameter. The slit is preferably about 10% longer than the gas discharge length of the laser. The slit width is approximately 3–4 mm. The blower 108 and preferably the laser system in general, is preferably operating while the precipitator loop including the pipe 109 is being used. The blower 108 is preferably running, while the rest of the laser system is shut down when the tube 109 is used in the gas and particulate removal process before re-filling the laser chamber 101 with fresh gases during a new fill. Advantageously, dust which is in the laser tube 101 will be whirled up and pumped away through the slit 111 in the pipe 109 efficiently. An advantage is that there will be less pollution around the fresh gas inlet from the gas handling unit 7 or at the ends of the tube 101, e.g., of the precipitator loop. Gas lifetime is increased and window contamination is reduced.

Methods and component systems have been described for stabilizing output beam parameters of a gas discharge laser by adjusting the gas mixture composition as the gas mixture composition changes with time and use. The methods and apparatus are based upon determining the corona discharge ignition voltage, preferably at the electrostatic precipitator, and using that voltage information in controlling the composition of the discharge gas mixture. Gas discharge laser systems which use the corona discharge ignition voltage value of the discharge chamber gas mixture in controlling their gas mixture composition adjustment actions are provided. These laser systems maintain stable laser output beam parameters by providing a regulatory feedback loop which controls the discharge gas mixture composition according to the corona discharge ignition voltage of the discharge gas mixture.

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow, and equivalents thereof.

In addition, in the method claims that follow, the operations have been ordered in selected typographical sequences. However, the sequences have been selected and so ordered for typographical convenience and are not intended to imply any particular order for performing the operations, except for those claims wherein a particular ordering of steps is expressly set forth or understood by one of ordinary skill in the art as being necessary.

What is claimed is:

1. An excimer of molecular fluorine laser system which emits a laser beam during operation and has a gas mixture with a gas composition initially provided within a discharge chamber, comprising:
    a discharge chamber containing a laser gas mixture at least including a halogen-containing species and a buffer gas;
    a plurality of electrodes within said discharge chamber and connected to a discharge circuit for energizing the gas mixture;
    a resonator for generating a laser beam;
    an electrostatic precipitator for having a voltage applied thereto and for receiving and precipitating contaminant particulates from a flow of said gas mixture; and
    a processor for monitoring the voltage applied to the electrostatic precipitator and for determining a status of said gas mixture based on the voltage applied to the electrostatic precipitator.

2. The laser system of claim 1, further comprising a gas control unit for replenishing the laser gas mixture in response to signals from the processor based on the status of said gas mixture determined from said voltage applied to said electrostatic precipitator.

3. The system of claim 2, wherein said gas mixture replenishing includes replenishing the halogen-containing species of said gas mixture.

4. The laser system of claim 1, wherein the gas mixture status includes a concentration of said halogen-containing species.

5. A method of stabilizing output beam parameters of an excimer or molecular fluorine laser system which emits a laser beam during operation and has a gas mixture with a gas composition initially provided within a discharge chamber, the laser system including an electrostatic precipitator, the method comprising the operations:
    monitoring a voltage applied to the electrostatic precipitator; and
    determining a status of said gas mixture based on the voltage applied to the electrostatic precipitator.

6. The method of claim 5, further comprising the operation replenishing the gas mixture based on the status of said gas mixture determined from said voltage applied to said electrostatic precipitator.

7. The method of claim 6, wherein said replenishing operation includes replenishing a halogen-containing species of said gas mixture.

8. The laser system of claim 5, wherein said determining step includes determining a concentration of a halogen-containing species of said gas mixture.

* * * * *